(12) United States Patent
Manautou et al.

(10) Patent No.: US 11,808,681 B1
(45) Date of Patent: Nov. 7, 2023

(54) AIRBORNE PARTICLE MONITOR HAVING ILLUMINATION SLEEVE WITH SHAPED BOREHOLE FOR INCREASED EFFICIENCY

(71) Applicant: Scanit Technologies, Inc., Fremont, CA (US)

(72) Inventors: Pedro Manautou, Milpitas, CA (US); Joel Kent, Fremont, CA (US); David Graham, Sonora, CA (US)

(73) Assignee: SCANIT TECHNOLOGIES, INC., Fremont, CA (US)

( * ) Notice: Subject to any disclaimer, the term of this patent is extended or adjusted under 35 U.S.C. 154(b) by 246 days.

(21) Appl. No.: 16/950,051

(22) Filed: Nov. 17, 2020

Related U.S. Application Data

(60) Provisional application No. 62/936,735, filed on Nov. 18, 2019.

(51) Int. Cl.
    *G01N 15/06* (2006.01)
    *H04N 7/18* (2006.01)
    *H04N 23/56* (2023.01)
    *G01N 15/00* (2006.01)

(52) U.S. Cl.
    CPC ............... *G01N 15/06* (2013.01); *H04N 7/18* (2013.01); *H04N 23/56* (2023.01); *G01N 2015/0046* (2013.01); *G01N 2015/0693* (2013.01)

(58) Field of Classification Search
None
See application file for complete search history.

(56) References Cited

U.S. PATENT DOCUMENTS

| | | | |
|---|---|---|---|
| 4,693,733 A | 9/1987 | Fuzimura | |
| 8,125,562 B2 | 2/2012 | Shaw | |
| 8,167,986 B2 | 5/2012 | Schneider | |
| 8,432,482 B2 | 4/2013 | Shaw | |
| 9,772,281 B2 | 9/2017 | Bertaux | |
| 9,851,229 B2 | 12/2017 | Gille | |
| 10,161,868 B2 | 12/2018 | Bertaux | |
| 10,724,935 B2 | 7/2020 | Lucas | |
| 10,794,810 B1 | 10/2020 | Brown | |
| 2004/0042008 A1* | 3/2004 | Wagner | G01N 15/14 356/337 |

(Continued)

FOREIGN PATENT DOCUMENTS

| | | |
|---|---|---|
| EP | 3215274 | 9/2017 |
| WO | WO2013182822 A1 | 12/2013 |

(Continued)

OTHER PUBLICATIONS

Utah Innovation Center, Pollen Sense, Feb. 7, 2017, pp. 1-3, available at <https://www.youtube.com/watch?v=5G4w5hMUQvU.

(Continued)

*Primary Examiner* — James M Anderson, II
(74) *Attorney, Agent, or Firm* — Staniford Tomita LLP

(57) ABSTRACT

A device includes a camera sensor and an illumination source structure. The illumination source structure is positioned to emit light towards a field of view of the camera sensor. The illumination source structure includes a bore, internal threads extending along at least a portion of a length of the bore, and a light emitting diode (LED) positioned within the bore such that the internal threads encircle a lens of the LED.

23 Claims, 18 Drawing Sheets
(1 of 18 Drawing Sheet(s) Filed in Color)

(56) References Cited

U.S. PATENT DOCUMENTS

| | | |
|---|---|---|
| 2014/0228657 A1 | 8/2014 | Palley |
| 2016/0116405 A1 | 4/2016 | Bertaux |
| 2016/0290912 A1* | 10/2016 | Kent ................... G01N 15/0612 |
| 2018/0087919 A1* | 3/2018 | Bertaux ................ G01N 21/49 |
| 2018/0284003 A1 | 10/2018 | Lucas |
| 2020/0103328 A1 | 4/2020 | Ozcan |
| 2020/0340900 A1 | 10/2020 | Brown |
| 2020/0340901 A1 | 10/2020 | Ozcan |
| 2020/0355597 A1 | 11/2020 | Allan |
| 2020/0358941 A1* | 11/2020 | Chen ..................... H04N 23/70 |
| 2022/0026334 A1* | 1/2022 | Tamraz ................ G01N 1/2273 |

FOREIGN PATENT DOCUMENTS

| | | |
|---|---|---|
| WO | WO2016073745 | 5/2016 |
| WO | WO2018165590 | 9/2018 |
| WO | WO2019210375 | 11/2019 |

OTHER PUBLICATIONS

Imlay, Ashley, "Utah County-based company Pollen Sense providing real-time data for seasonal allergy sufferers" Deseret News, Sep. 29, 2020, available at < https://www.deseret.com/utah/2020/9/29/21411381/utah-county-company-pollen-sense-real-time-data-seasonal-allergies>, retrieved May 25, 2023, pp. 1-6.

Pollen Sense, Pollen Wise, "Pollen Sensor Tape Replacement Tutorial," Feb. 14, 2020, p. 1 of 1, available at <https://www.youtube.com/watch?v=tODGIHP51I8>, retrieved Jun. 2, 2023.

Pollen Sense PS-400 Particulate Sensor, Pollen Sense, available at < https://www.pollensense.com/pages/automated-particle-sensors >, retrieved Jun. 2, 2023.

* cited by examiner

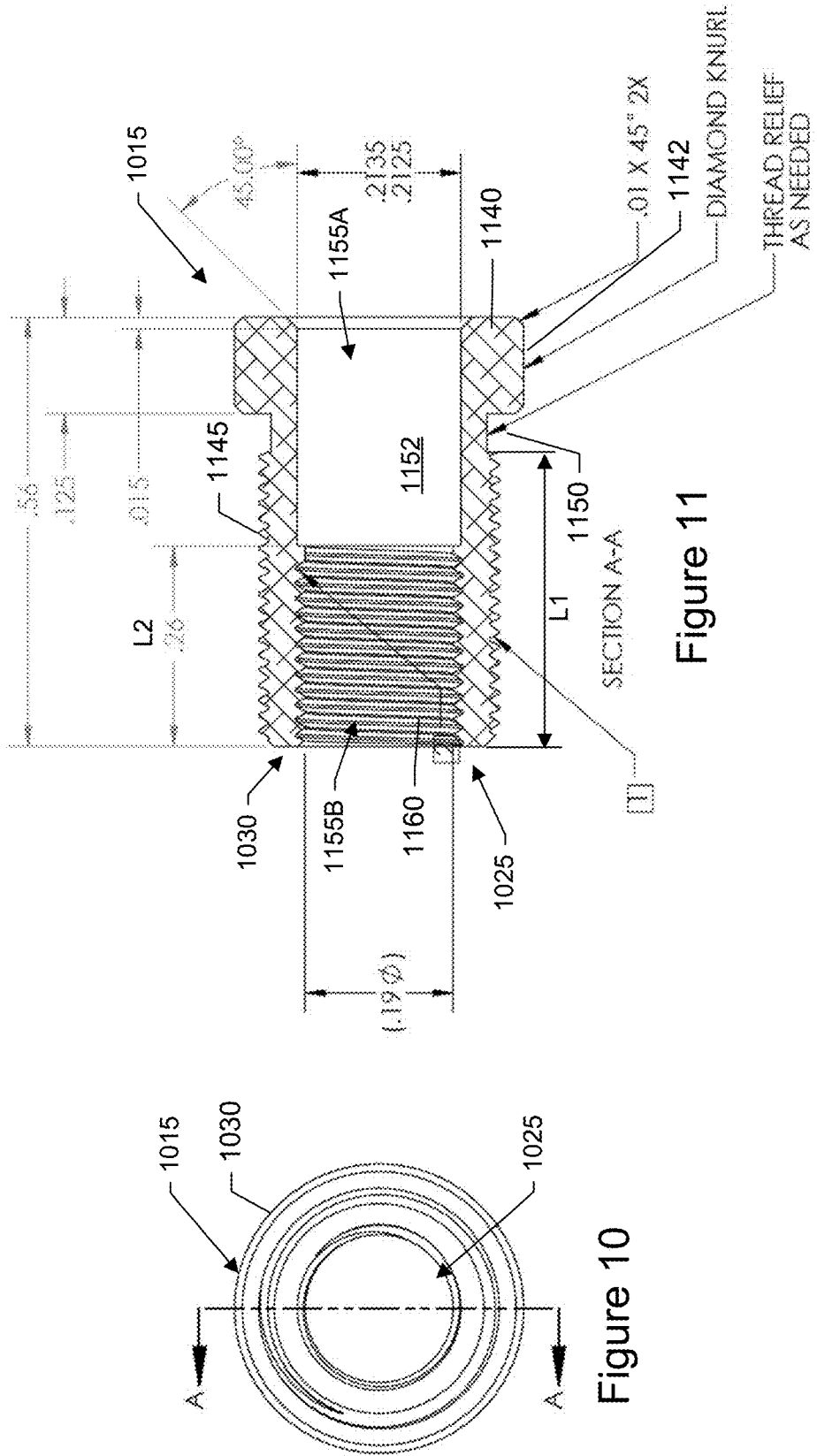

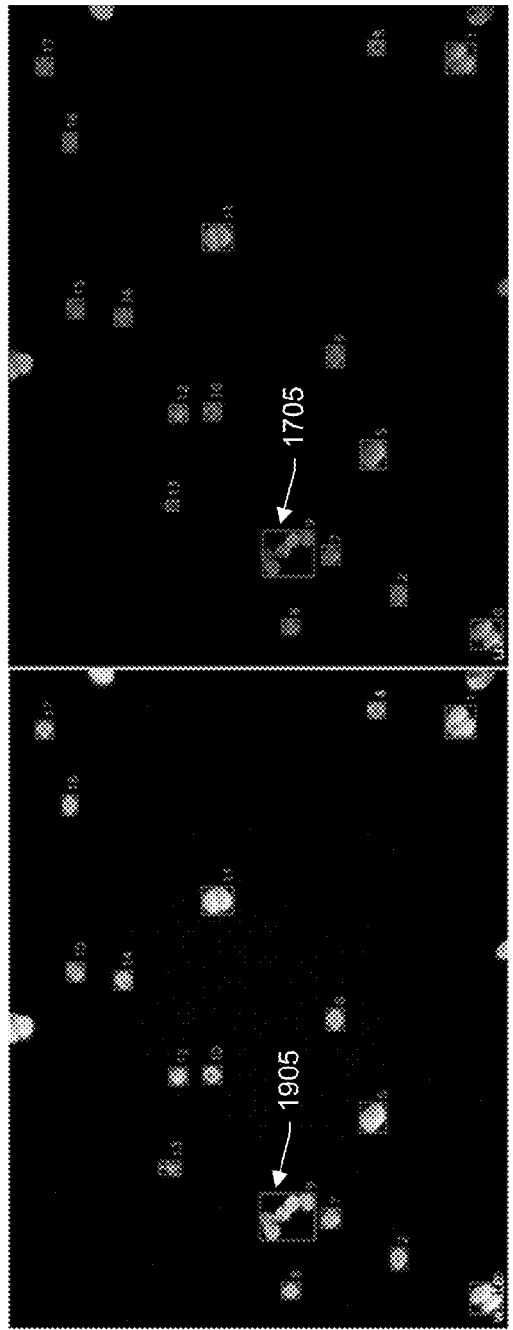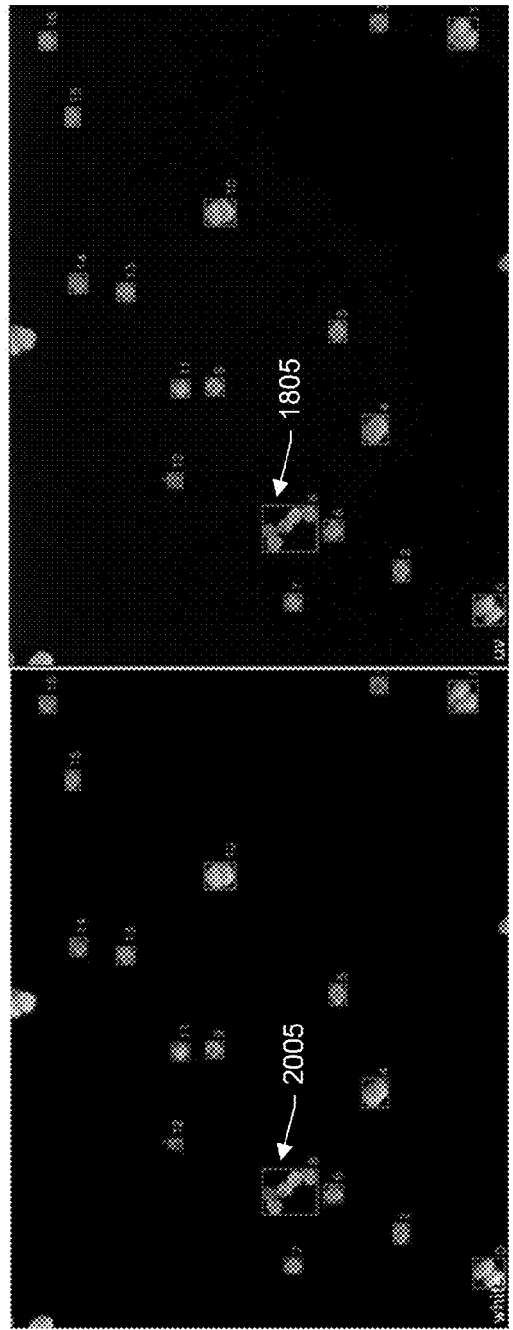

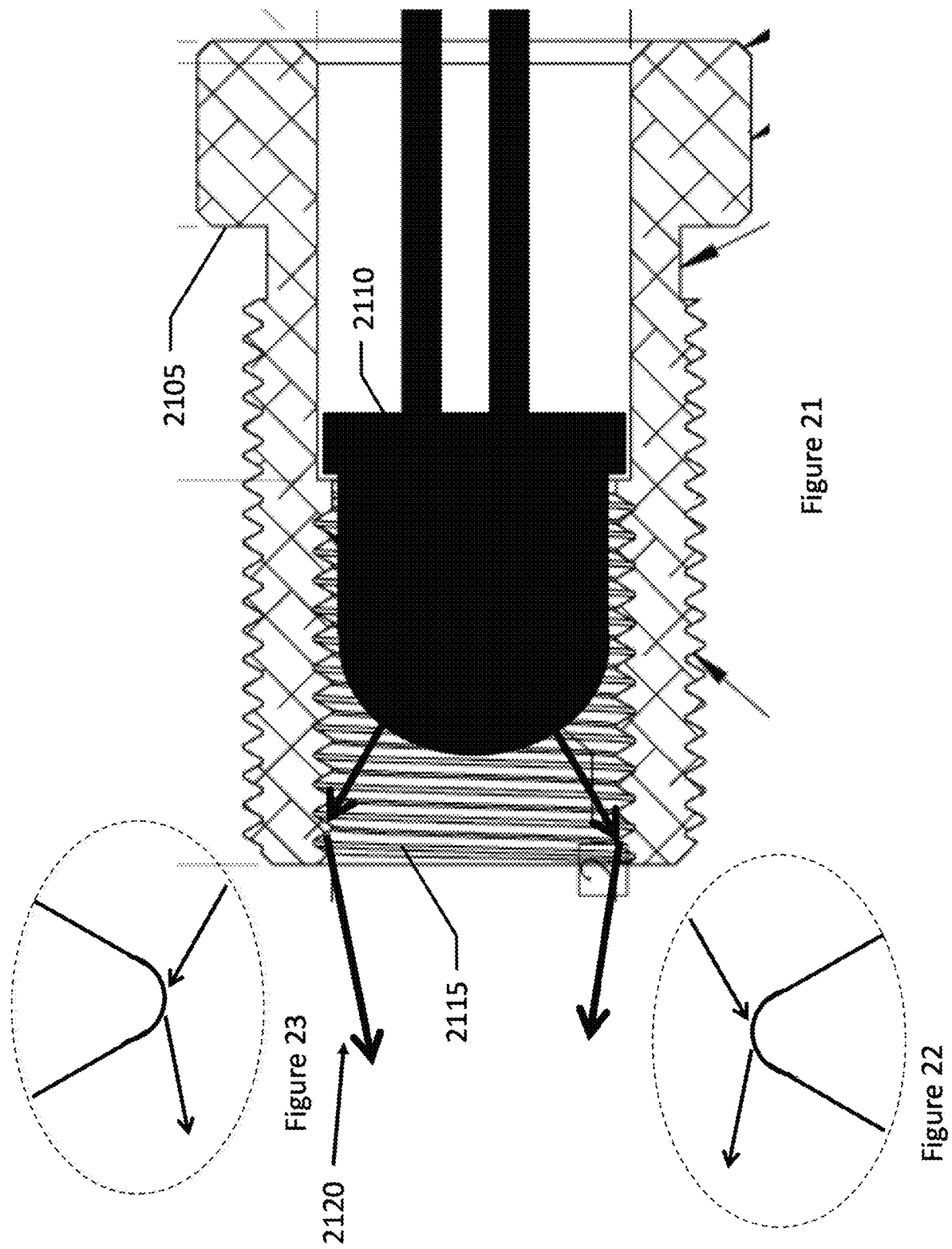

Modified threads to enhance desired specular reflections

Cone modified threads to enhance desired specular reflections

AIRBORNE PARTICLE MONITOR HAVING ILLUMINATION SLEEVE WITH SHAPED BOREHOLE FOR INCREASED EFFICIENCY

CROSS-REFERENCE TO RELATED APPLICATIONS

This application claims priority to U.S. provisional patent application 62/936,735, filed Nov. 18, 2019, which is incorporated by reference along with other cited references in this application.

BACKGROUND

The present invention relates to the field of self-fluorescence microscopy, and more specifically, to systems and techniques of detecting and identifying airborne particles.

Ambient air can contain airborne particulate matter. Examples of particulate matter include dust, pollen, mold spores, diesel soot, and much more. These particles can be harmful to human health, crops, certain types of manufacturing facilities (e.g., clean rooms), and others. For example, certain mold and fungal spores can cause damage to agricultural crops. Certain pollens can induce allergic reactions indoors and outdoors in humans and animals. Thus, it is important to monitor airborne particulate matter so that harmful particles can be detected, identified, and action taken to mitigate their effects.

Self-fluorescence microscopy is based on the interaction between matter and incident electromagnetic radiation. Such incident radiation may include visible light, non-visible light (e.g., ultraviolet light), or both. Much of the technical literature concerning fluorescence microscopy involves the addition of fluorescent tags to the objects being studied. Fluorescent tags often are molecules including both a fluorescent portion and an anti-body portion. In contrast 'self fluorescence' is fluorescence of the object under study with no addition of fluorescent tags. Self-fluorescence microscopy has the advantage of eliminating the need for wet-chemistry sample preparation. Self-fluorescence microscopy has the disadvantage of providing relatively weak fluorescence signals, thus making it more difficult to provide sufficient incident radiation illumination intensity at low-cost. Principles of self-fluorescence microscopy can be used to identify airborne particles. In such applications, there is a need to provide improved illumination conditions in order to ensure accurate detection and classification of particles using self-fluorescence imaging techniques.

There is a need to provide systems and techniques that facilitate accurate and rapid detection and classification of airborne particles, but that are also cost-effective and easy to operate and maintain.

BRIEF SUMMARY OF THE INVENTION

In a specific embodiment, a device includes a camera sensor and an illumination source structure. The illumination source structure is positioned to emit light towards a field of view of the camera sensor. The illumination source structure includes a bore, internal threads extending along at least a portion of a length of the bore, and a light emitting diode (LED) positioned within the bore such that the internal threads encircle a lens of the LED.

Other objects, features, and advantages will become apparent upon consideration of the following detailed description and the accompanying drawings, in which like reference designations represent like features throughout the figures.

BRIEF DESCRIPTION OF THE FIGURES

The patent or application file contains at least one drawing executed in color. Copies of this patent or patent application with color drawing(s) will be provided by the Office upon request and payment of the necessary fee.

FIG. 10 shows a view of an end of a UV LED illumination sleeve, according to one or more embodiments.

FIG. 11 shows a side view of the UV LED illumination sleeve shown in FIG. 10, according to one or more embodiments.

FIG. 17 shows a self-fluorescence microscope image of particles (e.g., spores) captured under UV illumination with a UV illumination sleeve not having internal threads, according to one or more embodiments.

FIG. 18 shows a self-fluorescence microscope image of particles (e.g., spores) captured under UV illumination with a UV illumination sleeve having internal threads, according to one or more embodiments.

FIG. 19 shows a self-fluorescence microscope image of particles (e.g., spores) captured under white light illumination with a white light illumination sleeve not having internal threads, according to one or more embodiments.

FIG. 20 shows a self-fluorescence microscope image of particles (e.g., spores) captured under white light illumination with a white light illumination sleeve having internal threads, according to one or more embodiments.

FIG. 21 shows a section view of an illumination sleeve, according to one or more embodiments.

FIG. 22 shows an enlarged view of internal threads of the illumination sleeve shown in FIG. 21, according to one or more embodiments.

FIG. 23 shows another enlarged view of internal threads of the illumination sleeve shown in FIG. 21, according to one or more embodiments.

DETAILED DESCRIPTION

Figure 1:
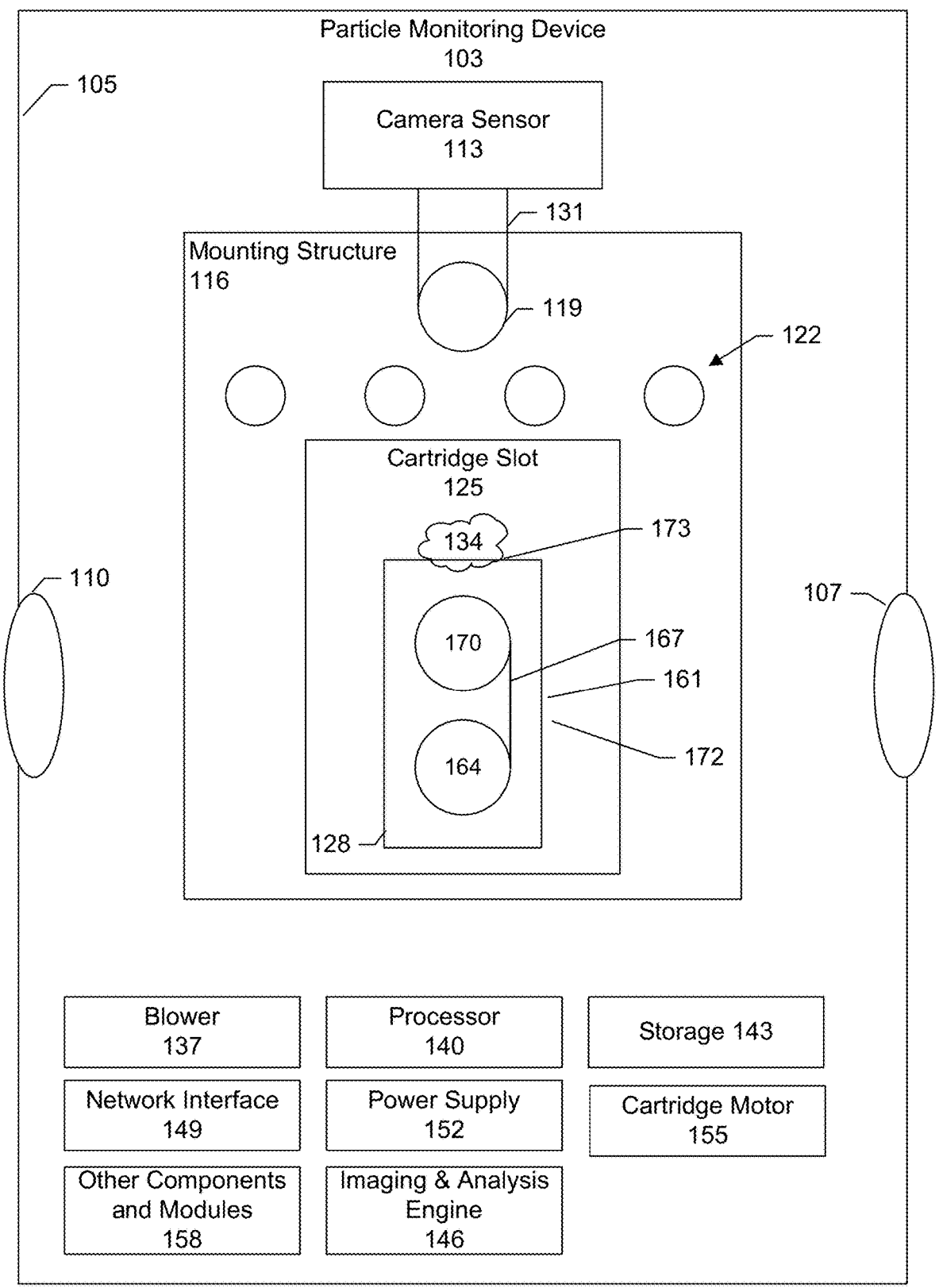
FIG. 1 shows a block diagram of an airborne particle monitoring device, according to one or more embodiments.

FIG. 1 shows a block diagram of a particle monitoring device 103. This particle monitoring device is designed to collect, analyze, classify, and identify or discriminate airborne particles of interest. Airborne particles of interest may include biological particles including bacteria, mold, pollen, and so forth. Certain types of bacteria and mold, for example, can be very harmful to agriculture including plants, crops, and vineyards. As another example, certain types of pollen can cause severe allergic reactions in humans. Therefore, it is desirable to be able to identify such airborne particles so that actions can be taken to help mitigate their effects. In a specific embodiment, the particle monitoring device hardware generates images for captured particles. Based on the images, associated software and processing techniques classify particles of interest.

In a specific embodiment, the particle monitoring device is designed as a small, portable, lightweight, and relatively inexpensive device. This allows the particle monitor to be easily placed in any number of locations where monitoring is desirable. Such locations may include, for example, an indoor location, such as an indoor farming facility, home, clean room, factory, office, or building, an outdoor location such as a vineyard or traditional outdoor farm, or mounted to a drone.

The particle monitoring device applies imaging techniques in order to discriminate, classify, or identify particles that have been collected. These imaging techniques involve directing certain wavelengths of light or radiation at the particles and capturing images. The images are examined to identify the particles based on their morphological and spectral signatures, e.g., how the particles emit, reflect, transmit, or absorb different wavelengths of light.

In a specific embodiment, the light directed at the particles includes ultraviolet (UV) light. UV light has a wavelength from about 100 nanometers (nm) to about 400 nm. In a specific embodiment, the UV light includes UV-A light (e.g., light having wavelengths ranging from about 320 nm to about 400 nm). Such light can cause certain objects to fluorescence from which they can be identified. Other examples of UV light include UV-B light (e.g., light having wavelengths ranging from about 290 nm to about 320 nm) and UV-C light (e.g., light having wavelengths ranging from about 100 to about 290 nm).

In another specific embodiment, the light directed at the particles includes white light. White light is composed a sufficiently broad range of visible-light wavelengths to excite all color pixels (i.e., red, green, and blue) of an RGB camera sensor.

In another specific embodiment, the light directed at the particles includes different colors of light such as red light, green light, blue light, yellow light, or combinations of these. Red light is typically light having a predominate wavelength of about 640 nanometers (nm), but may range from about 620 nanometers to about 750 nanometers. Green light is typically light having a predominate wavelength of about 540 nanometers, but may range from about 510 nanometers to about 570 nanometers. Blue light is typically light having a predominate wavelength of about 470 nanometers, but may range from about 450 nanometers to about 495 nanometers. Yellow light is typically light having a predominate wavelength of about 580 nanometers, but may range from about 570 nanometers to about 590 nanometers.

It should be appreciated that the particle monitor may be configured to direct any wavelength of light or radiation to the particles including non-visible light, visible light (e.g., light having a range of wavelengths from about 380 nm to about 750 nm), electromagnetic radiation, infrared light, near infrared light, ultraviolet light, far-ultraviolet light, near-ultraviolet light, or combinations of these.

As shown in the example of FIG. 1, this particle monitoring device includes a housing 105. The housing includes an air intake opening 107 and an air exhaust opening 110. The housing contains a microscope system to analyze airborne particles that have been captured. Specifically, the housing contains a camera sensor 113 and a mounting structure 116 positioned below the camera sensor. The mounting structure includes an optical column hole 119, an illumination system including a set of illumination or radiation source structures 122, and a cartridge slot 125. The cartridge slot holds a removable cartridge 128 onto which the particles are collected. An optical column 131 having one or more lenses extends between the camera sensor and the optical column hole. A region below the optical column hole and illumination source structures may be referred to as a particle inspection zone 134. The particle inspection zone corresponds to a field of view of the camera sensor.

The particle monitoring device may further include a blower 137, processor 140, storage 143, imaging and analysis engine 146, network interface 149, power supply 152, cartridge motor 155, and other components and modules 158 (e.g., antenna, global positioning sensor (GPS), temperature sensor, universal serial bus (USB) ports, display, or memory), each of which may be connected to each other via an interconnect.

The blower is responsible for creating a vacuum that draws ambient air containing airborne particles through the air intake opening, to an air intake zone 161 on a side of the removable cartridge, and out the air exhaust opening. The removable cartridge includes a capture media with which to trap airborne particles. In a specific embodiment, the removable cartridge includes a supply reel 164 onto which tape 167 having an adhesive surface is wound. The tape extends from the supply reel, past the air intake zone, past the particle inspection zone, and terminates at an uptake reel 170. A side 172 of the cartridge at the air intake zone is open so that the particles can enter the cartridge and be trapped on the adhesive surface of the tape. A side 173 of the cartridge at the particle inspection zone is likewise open or otherwise exposed (e.g., visible) so that the camera sensor can capture images of the trapped particles for analysis. The images may be referred to as microscope images.

In a specific embodiment, the camera sensor includes an RGB (red-green-blue) sensor such as may be found in a low-cost, consumer-grade camera. Despite the relative lack of sophistication of an RGB camera sensor, the systems and techniques described herein allow for accurate identification and discrimination of particles.

The cartridge motor engages with the uptake reel and perhaps also the supply reel to advance the tape (or a portion of the tape having the trapped particles) from the air intake zone to the particle inspection zone.

Once the trapped particles have arrived at the particle inspection zone, the illumination source structures emit light towards the particles while the camera sensor captures one or more images of the particles. The light may include UV light, visible light, or both. Two or more illumination sources may be activated sequentially. Instead or additionally, two or more illumination sources may be activated concurrently or simultaneously. The captured images may be stored on the storage. The imaging and analysis engine may include executable code, logic, instructions, or algorithms for analyzing the images to identify the particles.

The network interface allows for communicating with the particle monitor over a network. The network may include a portion of a global computer network such as the Internet, although other types of networks can be part of the network, including a wide area network (WAN), a local area network (LAN), a satellite network, a telephone or cable network, a cellular network, a wireless network such as a WiFi or WiMAX network, or various portions or combinations of these and other types of networks. The network in some embodiments therefore comprises combinations of multiple different types of networks each comprising processing devices configured to communicate using Internet Protocol (IP) or other related communication protocols.

The processor controls the overall operation of the particle monitoring device including, for example, running the imaging and analysis engine, directing the activation and deactivation of the illumination sources, and so forth.

The power supply provides power to the various electrical components of the particle monitoring device. In a specific embodiment, the particle monitoring device may be powered by a battery. The battery can be a rechargeable battery. In another specific embodiment, the particle monitoring device may be provided power from a wall outlet. For example, the particle monitoring device may include a USB input port to which an end of a USB connector of a USB cable may be connected. An opposite end of the USB cable may be connected to a power source such as a wall adapter (to a wall outlet) or external battery pack. There are various other features and embodiments of the particle monitoring device. Some of these implementations are discussed in U.S. Pat. No. 9,933,351, issued Apr. 3, 2018, U.S. Pat. No. 10,458,990, issued Oct. 29, 2019, and U.S. provisional patent application 62/904,804, filed Sep. 24, 2019. These patents and patent applications are assigned to the same assignee as this patent application and are incorporated by reference.

In a specific embodiment, a surface of one or more illumination source structures is processed or includes surface features to increase the efficiency of light directed towards the captured particles at the particle inspection zone as compared to a surface that is not processed or otherwise lacks such surface features. The increased efficiency can be an increase in an amount of light—including UV light—directed towards the captured particles, a reduction in artifacts that may be present in images of the captured particles, an increase in lumens, an improvement in desired color quality, an improvement in desired brightness, or combinations of these. Further discussion is provided below.

Figure 2:
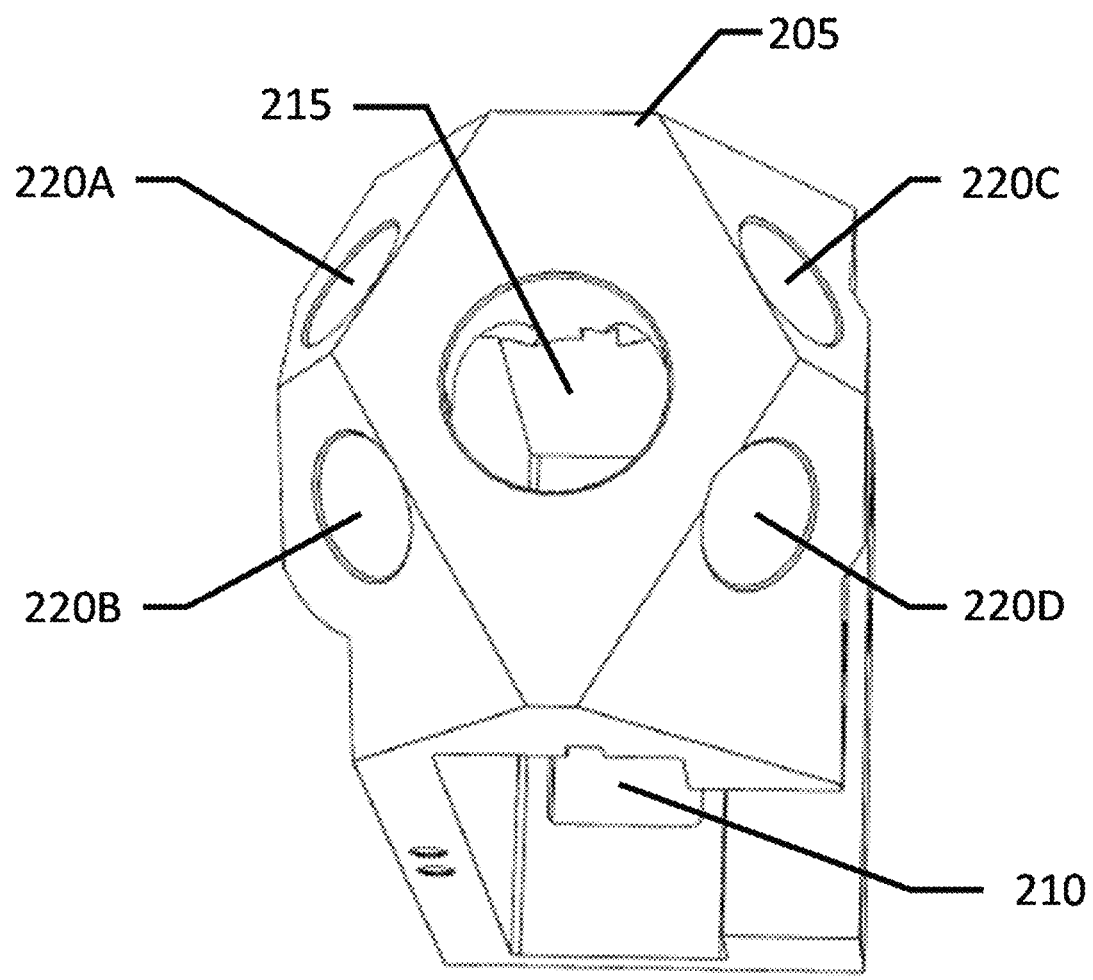
FIG. 2 shows a top view of a mounting structure of an airborne particle monitoring device, according to one or more embodiments.
Figure 3:
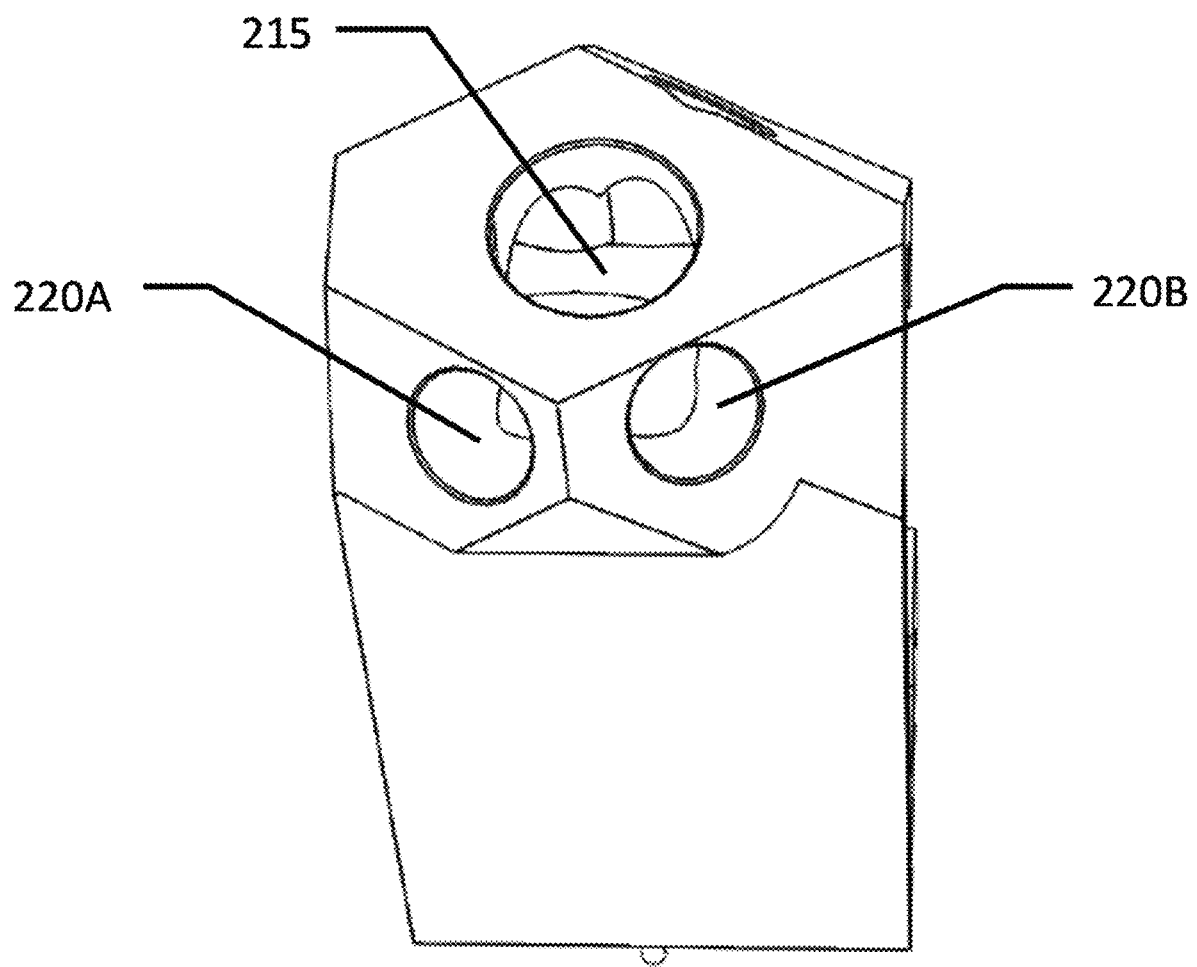
FIG. 3 shows another top view of the mounting structure, according to one or more embodiments.

FIG. 2 shows a top view of a mounting structure 205 for a particle monitoring device, according to one or more embodiments. FIG. 3 shows another top view of the mounting structure shown in FIG. 2. Referring now to FIG. 2, in a specific embodiment, the mounting structure may be referred to as a microscope-system mounting structure. In this specific embodiment, the mounting structure includes a slot 210 to receive a removable media cartridge so as to locate the particle inspection zone under optical-column hole 215. The microscope-system mounting structure also includes four illumination source holes 220A-D which support corresponding illumination sources.

In a specific embodiment, the illumination sources include light emitting diodes (LEDs) and the illumination holes may be referred to as LED holes. These LED holes are cylindrical in shape and include cylindrical axes that intersect the particle inspection zone of the media cartridge. In other words, the illumination holes are oriented to face the particle inspection zone or field of view of the camera sensor.

Other embodiments of a particle monitoring device may include a different number of illumination sources. For example, there can be a single illumination source. There can be 2, 3, 5, 6, 7, 8, 9, 10, or more than 10 illumination sources. Each illumination source may be configured to emit light of a particular predominate wavelength. Instead or additionally, two or more illumination sources may be configured to emit light of the same particular predominate wavelength. One illumination source of the two or more illumination sources may be oriented at a first position, side, or angle relative to the particle inspection zone. Another illumination source of the two or more illumination sources may be oriented at a second position, side, or angle relative to the particle inspection zone, different from the first.

In a specific embodiment, three of the four LED holes are filled with white-light LEDs leaving a fourth hole that is filled with a UV LED. In this specific embodiment, the LEDs are not directly mounted in the LED holes, but rather mounted in plastic "sleeves" that are in turn inserted into the LED holes of the microscope-system mounting structure. A sleeve may be referred to as a holder, light emitting holder, or LED holder.

Figure 4:
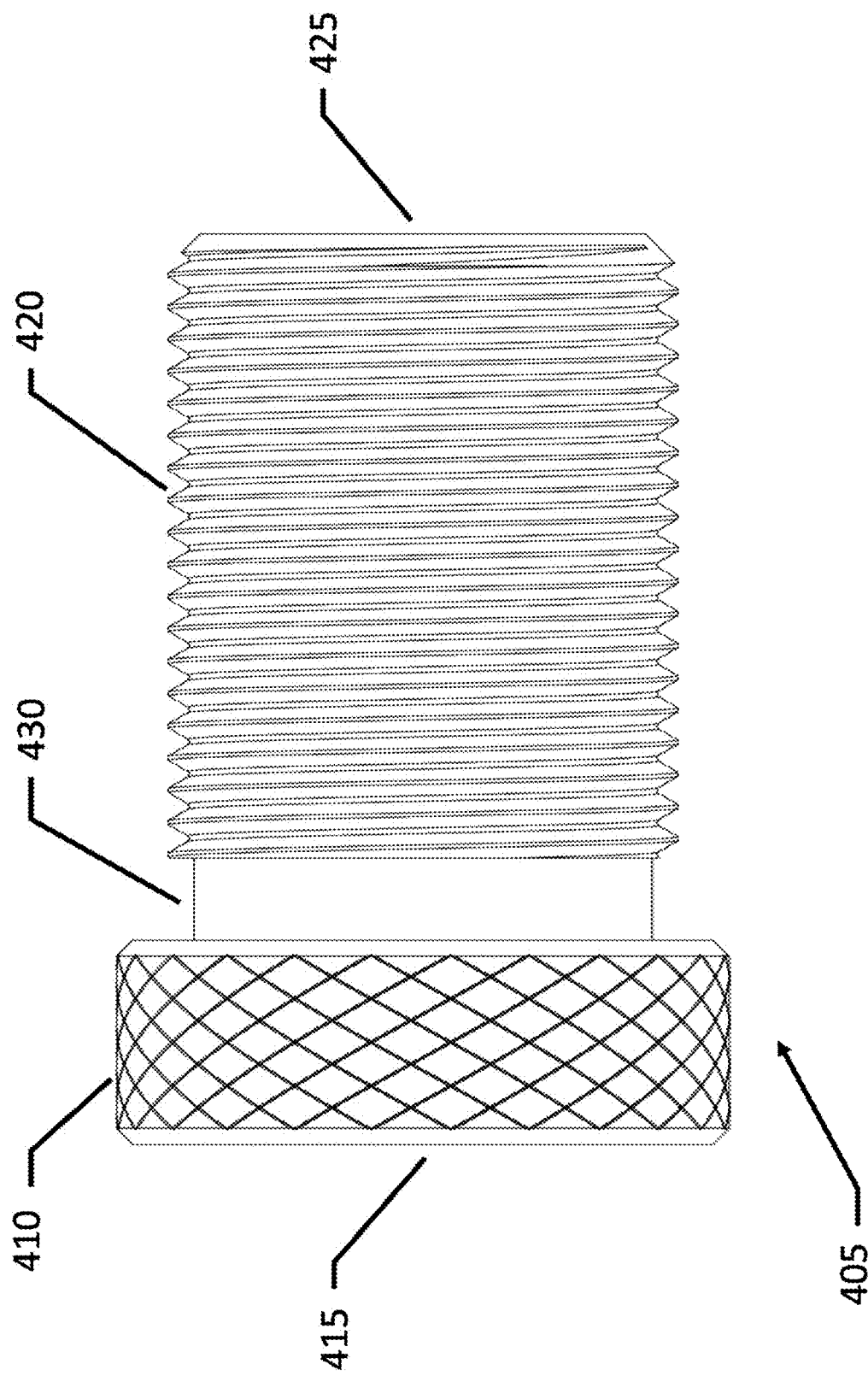
FIG. 4 shows a side view of an illumination sleeve for an ultraviolet (UV) light emitting diode (LED), according to one or more embodiments.
Figure 5:
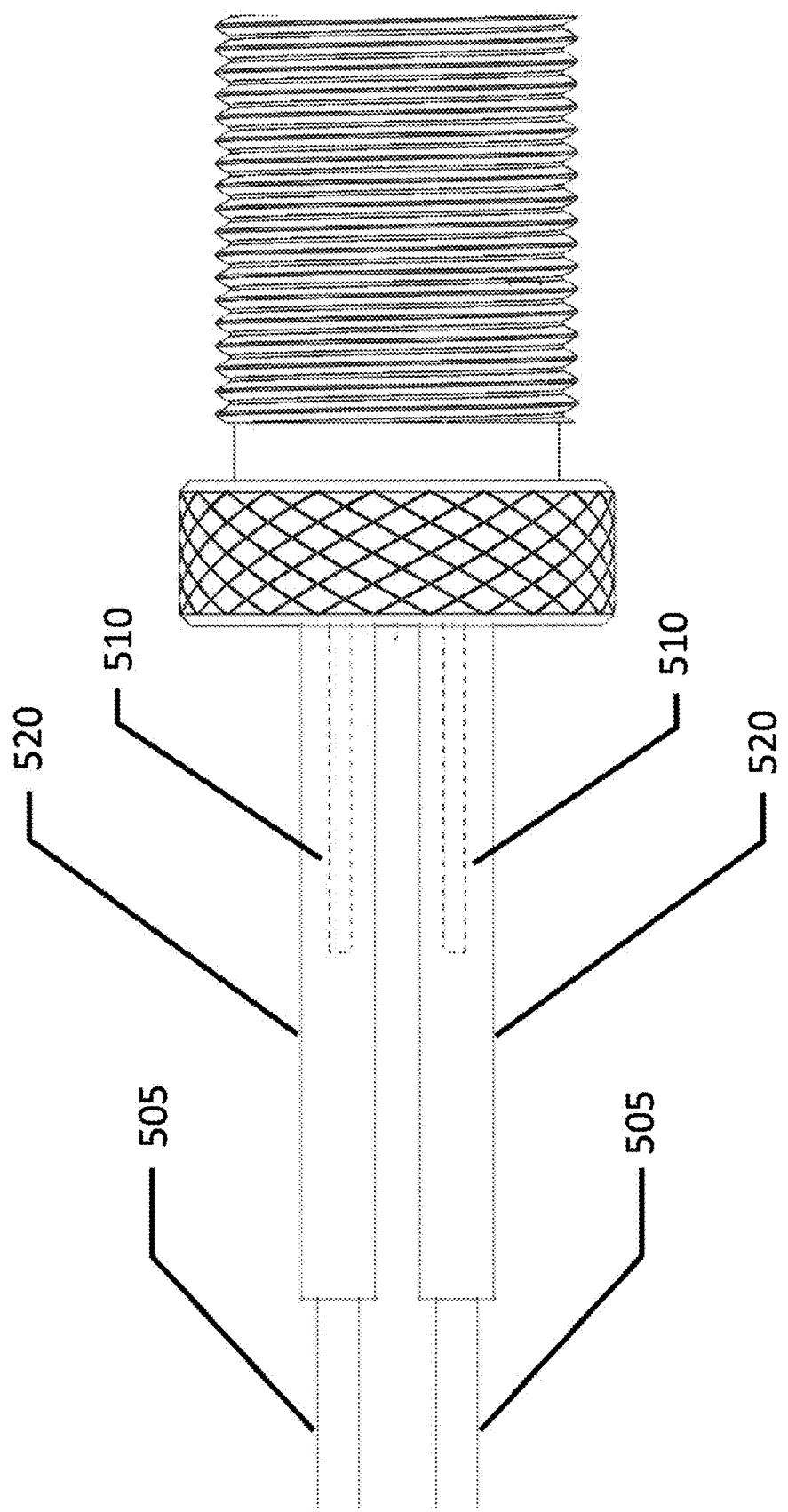
FIG. 5 shows a side view of the illumination sleeve shown in FIG. 4 with the UV LED having been inserted, according to one or more embodiments.
Figure 6:
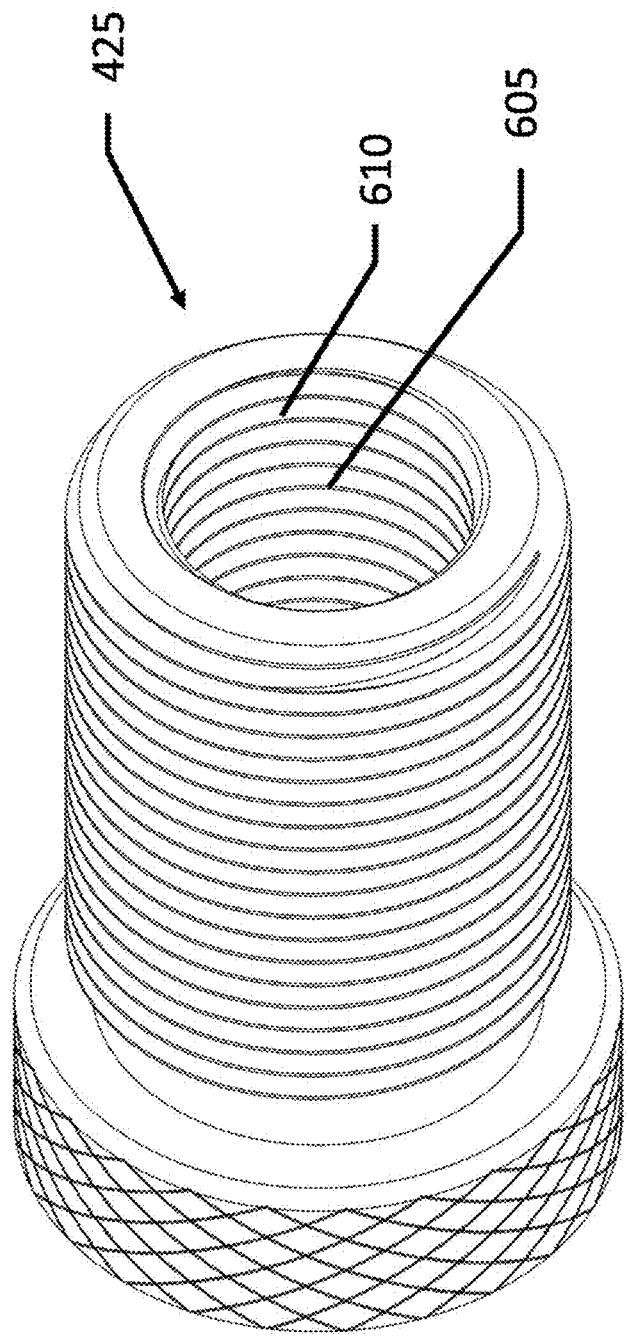
FIG. 6 shows a view of an end of the illumination sleeve shown in FIG. 4, according to one or more embodiments.
Figure 7:
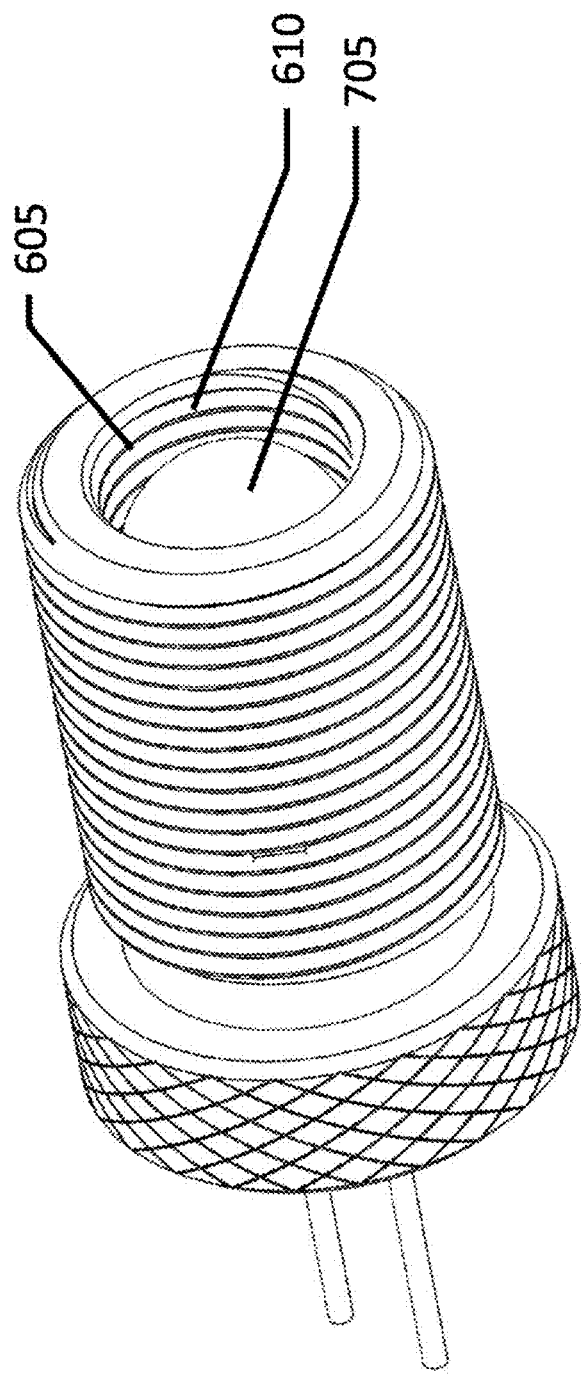
FIG. 7 shows a view of the end of the illumination sleeve shown in FIG. 5 with the UV LED, according to one or more embodiments.

FIGS. 4-7 show various views of a UV LED sleeve. Specifically, FIG. 4 shows a view of a UV LED sleeve without a UV LED bulb. FIG. 5 shows a view of the sleeve with the UV LED bulb. FIG. 6 shows a view of an end of the UV LED sleeve without the UV LED bulb. FIG. 7 shows a view of the end of the UV LED sleeve with the UV LED bulb. A sleeve may be referred to as a tube.

Referring now to FIG. 4, this figure shows a side view of a UV LED sleeve 405. The UV LED sleeve includes a sleeve head 410 at a first end 415 of the sleeve and external threads 420 starting at a second end 425, opposite the first end, of the sleeve and extending towards the first end. A relief 430 is between the head and external threads.

FIG. 5 shows a view of the UV LED sleeve with a UV LED bulb having been inserted into the sleeve. As shown in the example of FIG. 5, the UV LED includes leads 510 which are connected to wires 505. The solder connection (not shown) between leads 510 and wires 505 are covered by heat shrink tubing 520. The wires extend out an opening of the sleeve at the first end.

FIG. 6 shows a view of second end 425 of the UV LED sleeve without the UV LED bulb. As shown in the example of FIG. 6, the UV LED sleeve includes a bore 605 where at least a portion of the bore includes internal threads 610. The threads form projecting helical ribs extending along at least a portion of a length of the bore. In this document, the meaning of the term "threads" is generalized to include sets of independent circular ribs that do not form a helix, although in this embodiment threads in the form of helical ribs is chosen for improved manufacturability. The bore may be referred to as a borehole, channel, passageway, or conduit.

FIG. 7 shows a view of second end 425 of the UV LED sleeve with the UV LED bulb having been inserted into the sleeve. As shown in the example of FIG. 7, when the UV LED bulb is positioned within the sleeve, a lens 705 of the UV LED bulb is recessed within bore 605 of the UV LED sleeve and surrounded by internal threads 610. The UV LED bulb is exposed through an opening of the bore at the second end. In this specific embodiment, there is no separate film, diffuser, or cover over the opening of the bore at the second end. Not having a film can reduce the manufacturing costs of the particle monitor. In another specific embodiment, there can be a separate film covering the opening of the bore at the second end.

Figure 8:
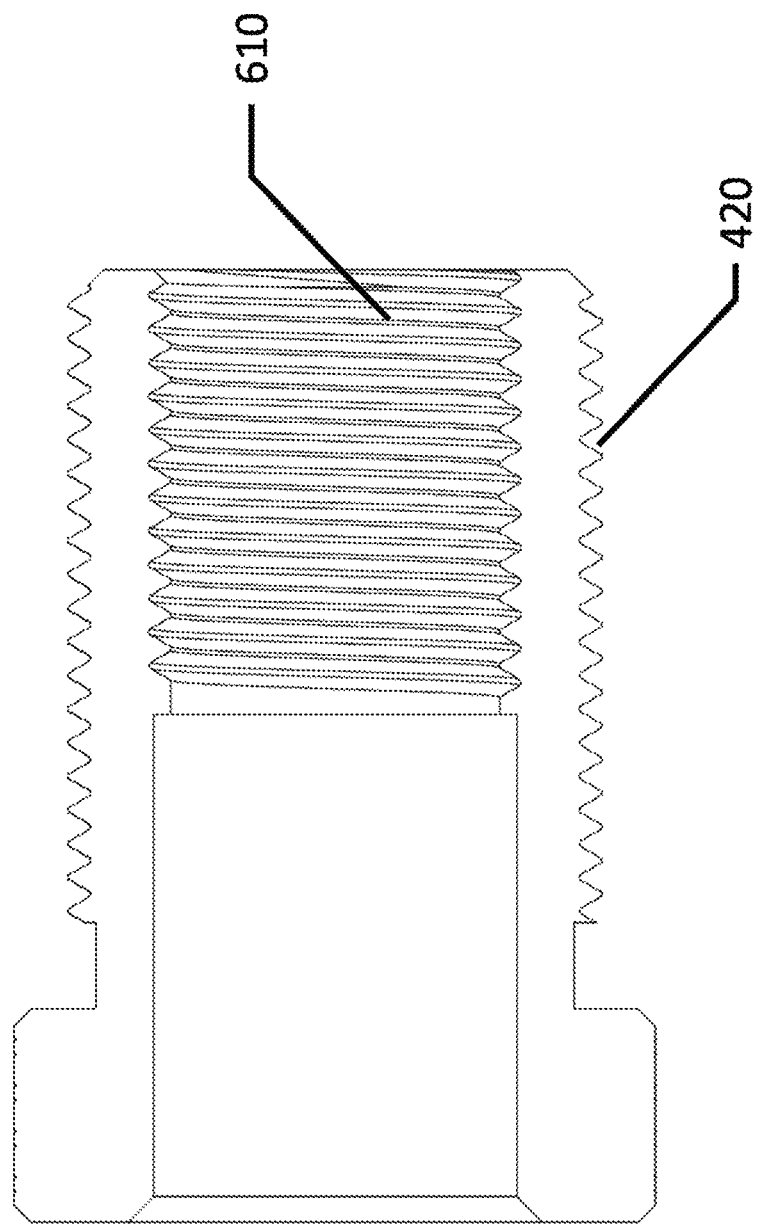
FIG. 8 shows a section view of the illumination sleeve shown in FIG. 4, according to one or more embodiments.
Figure 9:
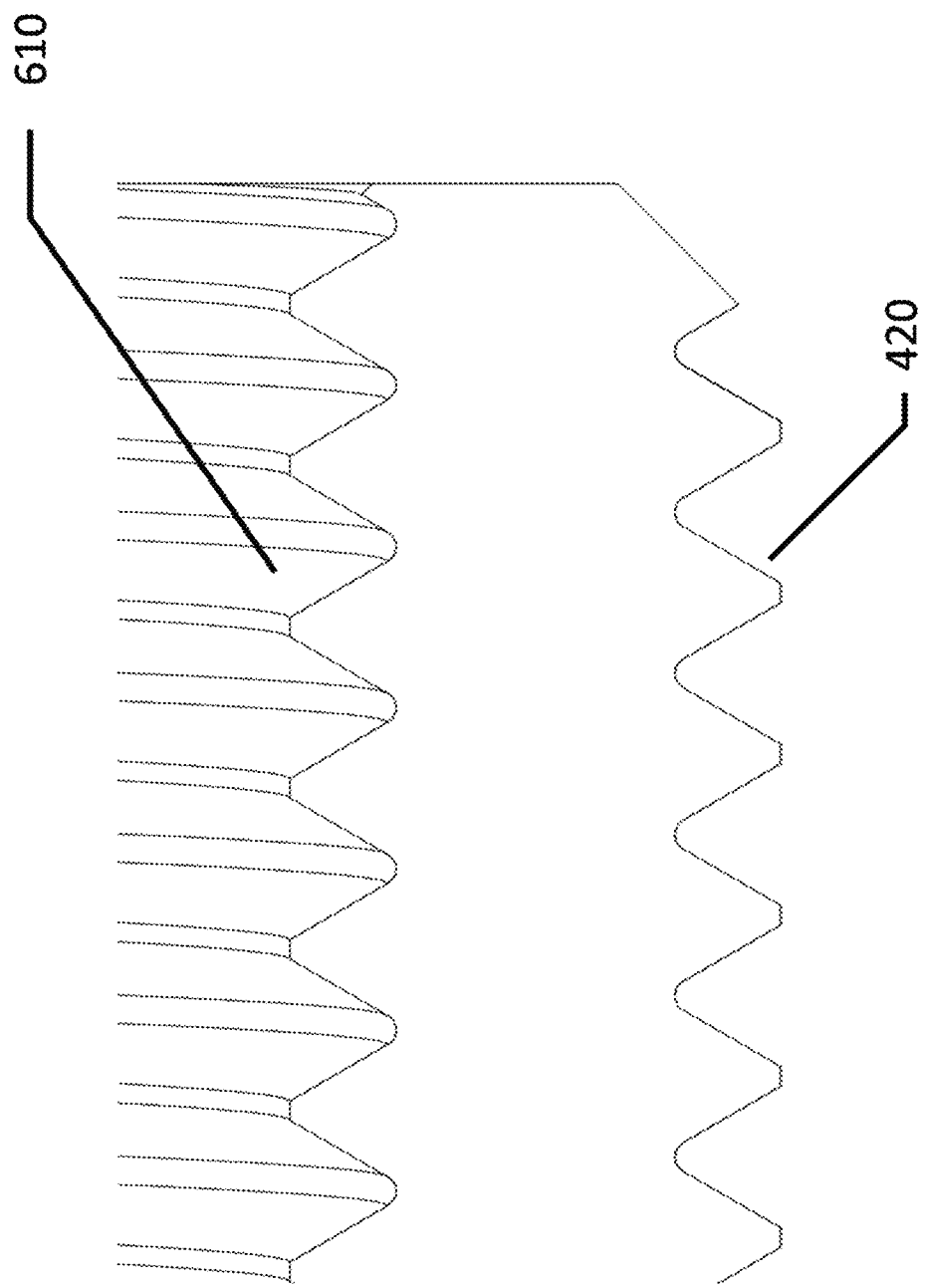
FIG. 9 shows an enlarged section view of the illumination sleeve shown in FIG. 8, according to one or more embodiments.

In a specific embodiment, the sleeve has both external and internal threads. It has been observed that the internal threads improve the efficiency with which the UV LED illuminates the particle inspection zone, thus increasing the brightness of the UV image, reducing the UV exposure time, or both. FIG. 8 shows a section view of the UV LED sleeve having been cut in half to further show internal threads 610 and external threads 420. FIG. 9 shows an enlarged section view of the internal and external threads.

FIG. 10 shows a view from an end 1025 of a UV LED sleeve 1030 to an end 1015, opposite end 1025. FIG. 11 shows a section view of UV LED sleeve 1030 along a section line A-A as shown in FIG. 10. As show in the example of FIG. 11, the UV LED sleeve includes end 1015 (e.g., first end) and end 1025 (e.g., second end), opposite the first end. The first end includes a head 1140 having a knurled surface 1142. External threads 1145 extend from the second end towards the first end and terminate at a thread relief 1150. A dimension L1 indicates a length of the external threads along a portion of a length of the sleeve. The thread relief is between the head and end of the external threads. An interior space of the UV LED sleeve defines a bore 1152 extending throughout the sleeve from the first to second end.

The bore is divided into a first portion 1155A and a second portion 1155B. The first portion does not include internal threads. The second portion includes internal threads 1160. In this specific embodiment, the internal threads extend at most along a portion of a length of the bore from the second end towards the first end, but terminate before reaching the first end. Another portion of the length of the bore from the first end to a termination of the internal threads may be smooth or may not include internal threads. A dimension L2 indicates a length of the internal threads. In a specific embodiment, a length of the internal threads is less than a length of the external threads. A length of the external threads is greater than a length of the internal threads.

FIG. 11 further shows some dimensions of the UV LED sleeve. More particularly, in a specific embodiment, a length of the sleeve is about 0.56 inches, a width or thickness of the head is about 0.125 inches, a length of the internal threads is about 0.26 inches. A diameter of the bore may range from about 0.2135 inches to about 0.2125 inches. For the external threads, a maximum major diameter is about 0.3141 inches. A minimum major diameter is about 0.3100 inches. A pitch of the external threads may be 0.01968 inches (0.5 mm). For the internal threads, a diameter is about 0.192 inches. An internal thread pitch is about 0.01968 inches (0.5 mm). In a specific embodiment, an opening to the bore at the sleeve head is beveled (e.g., beveled at about a 45 degree angle). An outer edge of the sleeve head may likewise be beveled. The beveling can help to facilitate assembly of the particle monitoring device by, for example, reducing the number of sharp edges that may cut an assembler's hand. Similarly, the knurling on the sleeve head helps to provide a good gripping surface so that the sleeve can be securely held when being inserted into the illumination holes of the mounting structure.

The sleeve head functions as a mechanical stop to help ensure that the sleeve is inserted reproducibly to the right or desired depth into the illumination hole (e.g., LED hole) of the mounting structure. The external threads allow the sleeve to be inserted into the LED hole with a reasonable force while maintaining the inserted sleeve in place with a firm friction hold or press-fit. No threads are required in the LED holes of the microscope-system mounting structure. The absence of threads in the LED holes of the mounting structure helps to reduce the manufacturing costs of the monitoring device.

In other words, in a specific embodiment, the particle monitoring device may be assembled by inserting the sleeve partially into an illumination hole (e.g., LED hole) formed in the mounting structure. The sleeve may be positioned so that second end 1025 of the sleeve is closer to the particle inspection zone 134 as compared to first end 1015 of the sleeve and is aligned (e.g., coaxially aligned) with the LED hole. The sleeve may then be pushed into the LED hole in a direction from the first end of the sleeve to the second end of the sleeve until the head of the sleeve abuts against or meets an edge of the mounting structure around the LED hole. The head of the sleeve may be sized such that a diameter of the head is greater than a diameter of the LED hole of the mounting structure.

Figure 12:
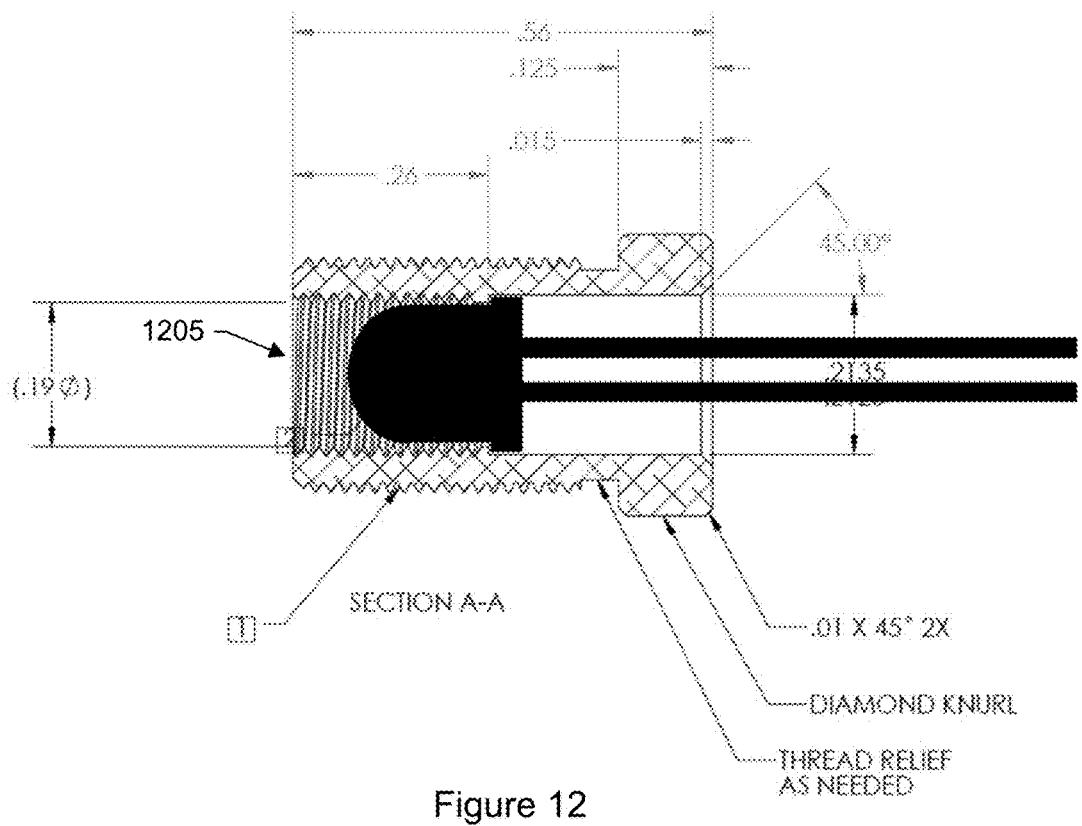
FIG. 12 shows a side view of the UV LED illumination sleeve shown in FIG. 11 with a UV LED having been inserted, according to one or more embodiments.

FIG. 12 shows a section view of the UV LED sleeve shown in FIG. 11 with a UV LED bulb 1205 having been inserted into the sleeve. In a specific embodiment, the UV LED is a Dowa UF4VL-1H321 UV LED of wavelength 340 nm as provided by Dowa Electronics Materials Co, Ltd. of Tokyo, Japan. Here "LED bulb" means the rigid monolithic LED body including lens, base and embedded light emitting source but not the pair of wires leaving the LED body. The LED shape illustrated in FIG. 12 corresponds to a through-hole LED package. In other embodiments other LED packages may be used. For example, SMT (Surface Mount Technology) packaged LEDs may be used. In another specific embodiment, quantum-dot based LEDs may be used. In other words, FIG. 12 shows a can packaged LED. However, there are also SMT packaged LEDs. There are many different types of LEDs having many different shapes and forms. Aspects and principles of embodiments for increasing light efficiency can be applied to any type of LED having any shape or form.

Figure 13:
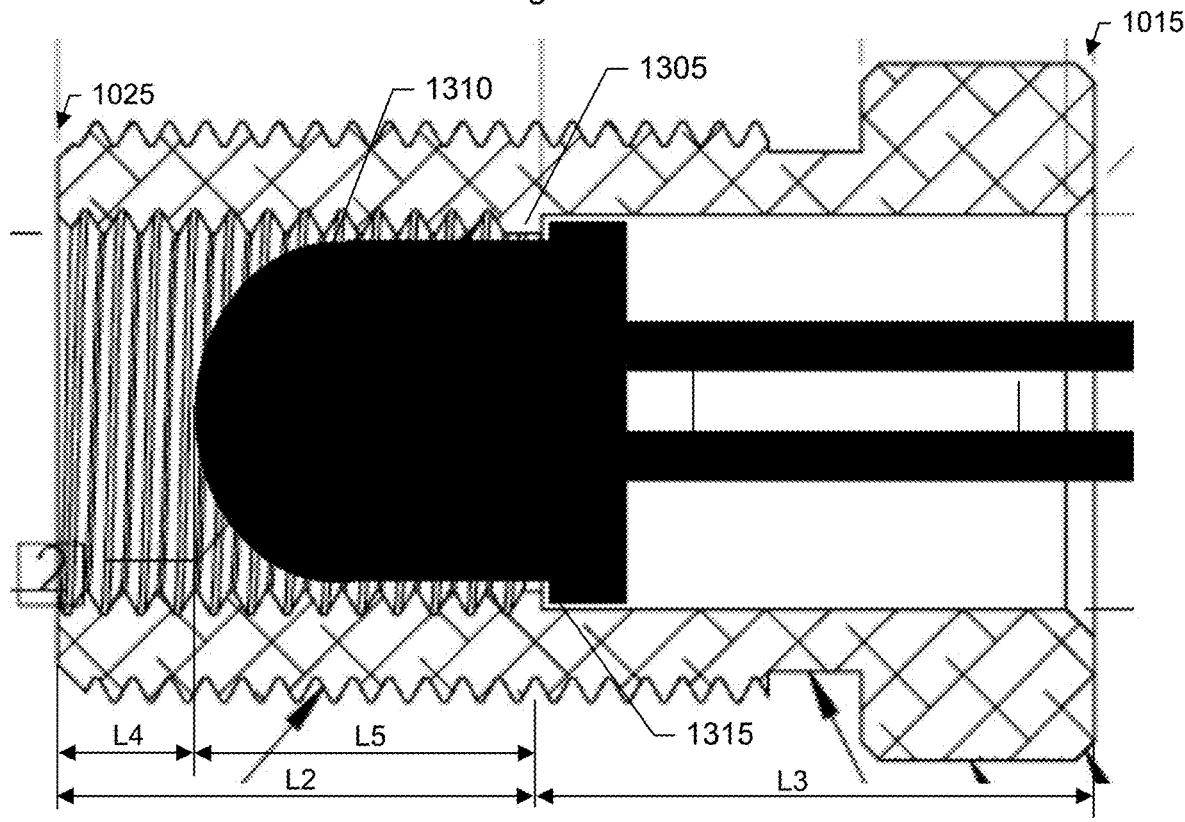
FIG. 13 shows an enlarged side view of the UV LED illumination sleeve shown in FIG. 12, according to one or more embodiments.

FIG. 13 shows an enlarged view of the view shown in FIG. 12. In a specific embodiment, there is a mechanical stop 1305 inside the sleeve that serves to position the UV LED. The mechanical stop marks an end of the internal threads.

A third length or distance L3 is from first end 1015 of the sleeve to the stop. The third length defines a length of the first portion of the bore which does not have internal threads. A second length L2 is from the stop to second end 1025. The second length defines a length of the second portion of the bore which has internal threads. A fourth length L4 is from second end 1025 to a tip of a lens, case, diffuser, or cover 1310 of the UV LED bulb. The fourth length defines a depth at which the tip of the LED lens sits or is positioned below the opening of the bore at the second end. A fifth length L5 is from the tip of the UV LED lens to a base of the UV LED. The internal threads may extend throughout the entire length of distance L2 or may extend only through a portion of distance L2. For example, in some embodiments, the internal threads may extend only throughout distance L4. In other embodiments the internal threads may extend through distance L4 and a left portion of distance L5; such embodiments may optically perform equally well if threads to the right of distance L5 contribute little to the illumination of the particle inspection zone.

The first portion of the bore defines a cavity within which the UV LED is received. The UV LED is positioned within the sleeve such that the UV LED lens extends into the portion of the bore having the internal threads. The mechanical stop extends radially into the bore and terminates to form an opening through which the UV LED lens can pass through, but not a base or flange 1315 of the UV LED. Rather, the base or flange of the UV LED abuts against the stop to provide a desired insertion depth of the UV LED into the sleeve. The stop may be referred to as a shelf or shoulder.

The insertion depth of the UV LED bulb into the sleeve is selected to provide the desired illumination conditions at the particle inspection zone (or field of view of the camera sensor). The insertion depth can be a function of a size of the LED, overall length of the sleeve, length of first portion of bore not having internal threads, length of the second portion of the bore having the internal threads, desired illumination characteristics at the particle inspection zone, or combinations of these. The lengths, distances, or insertion depth of the UV LED into the sleeve may vary depending upon factors such as the specific type of LED, size of LED, design of the LED, and other factors.

More specifically, the insertion depth (e.g., lengths L3 and L2) may be selected so that the lens of the UV LED bulb remains within the bore of the sleeve. In other words, in a specific embodiment, the lens of the UV LED bulb does not extend past the second end or opening of the sleeve bore. The UV LED is positioned within the sleeve such that the lens of the UV LED terminates before reaching the opening of the sleeve bore.

In a specific embodiment, the internal threads play no role in the positioning or attaching of the UV LED. In this specific embodiment, the sole purpose of the internal threads is to improve optical illumination of the particle inspection zone by the UV LED. In other words, in a specific embodiment, the internal threads remain unengaged. In a specific embodiment, at least a portion of the bore having the internal threads extends past the tip of the UV LED lens (see, e.g., length or distance L4). The internal threads may encircle or surround a lens of the LED. A length of the internal threads may be greater than a length of the lens of the LED. The lens of the LED may not extend past an opening of the bore. In other words, the LED may be recessed within the bore. The external threads of the sleeve may encircle or surround at least a portion of the internal threads.

In a specific embodiment, length L2 is less than length L3. The positioning of the UV LED within the sleeve helps to provide good optical illumination while also helping to ensure that the overall size and form factor of the particle monitor remains compact. In other embodiments, however, the length L2 may be greater than length L3. Alternatively, lengths L2 and L3 may be the same. In another specific embodiment, at least a portion of the UV LED lens may extend past the opening of the sleeve bore at the second end.

As discussed, while some specific dimensions of the sleeve have been described, it should be appreciated that the dimensions can vary widely depending upon factors such as the type and size of LED selected, design of the selected LED, illumination conditions desired at the particle inspection zone, other factors, or combinations of these.

Figure 16:
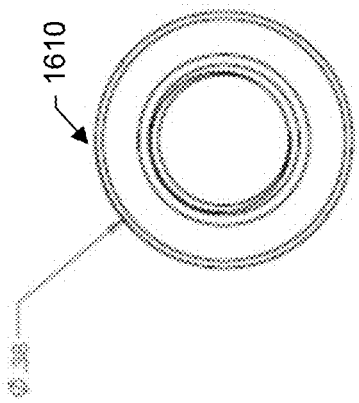
FIG. 16 shows a view of an end of the illumination sleeve shown in FIG. 15, according to one or more embodiments.
Figure 15:
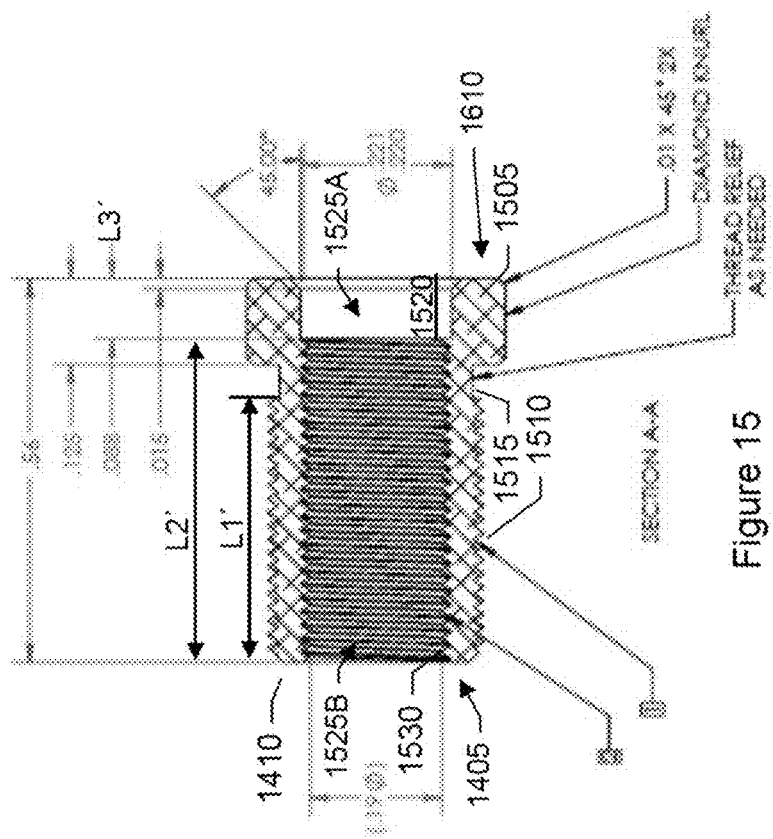
FIG. 15 shows a section view of the illumination sleeve shown in FIG. 14, according to one or more embodiments.
Figure 14:
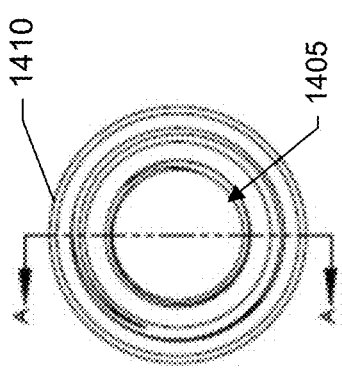
FIG. 14 shows a view of an end of an illumination sleeve for a white light LED, according to one or more embodiments.

For example, FIGS. 14-16 show a sleeve for a white LED. FIG. 14 shows a view from an end 1405 of a sleeve 1410 for a white LED. FIG. 15 shows a section view of white LED sleeve 1410 along a section line A-A as shown in FIG. 14. FIG. 16 shows a view from an opposite end 1610 of the white LED sleeve. The white LED sleeve as shown, for example, in FIG. 15 has similarities to the UV LED sleeve as shown, for example, in FIG. 11.

For example, the white LED sleeve likewise includes a sleeve head 1505 at end 1610 (e.g., first end), external threads 1510 extending from end 1405 (e.g., second end) towards the first end and terminating at a thread relief 1515, a bore 1520 divided into first and second portions 1525A,B, where the first portion does not include internal threads and the second portion includes internal threads 1530. In other words, the internal threads extend from the second end towards the first end along at most a portion of a length the bore. The first portion of the bore defines a cavity within which the white LED is received.

For the white LED sleeve, a length L3' of the first portion of the bore not having the internal threads is less than a length L2' of the second portion of the bore having internal threads. A length L1' of the external threads is less than a length of the internal threads.

FIGS. 17-20 show images of particles as captured by a camera sensor of a particle monitoring device to illustrate the effectiveness of having internal threads around a bore within which an LED bulb is positioned. The boxes around the particles indicate detection of the particles by the imaging and analysis engine of the particle monitor.

FIG. 17 shows an image of the particles captured during illumination with a UV LED bulb mounted in a sleeve without internal threads. FIG. 18 shows an image of the particles captured during illumination with the UV LED bulb mounted in a sleeve with internal threads. Camera sensor settings for the UV-light included a 15 second shutter exposure time and ISO 50.

The images shown in FIGS. 17 and 18 show fluorescence of the particles due to the UV light. Fluorescence is luminescence that is caused by the absorption of radiation at one wavelength followed by nearly immediate reradiation usually at a different wavelength (e.g., visible wavelength). The presence or lack of fluorescence can help to identify the particles. As can be seen in the images shown in FIGS. 17 and 18, the UV fluorescence image captured using a sleeve having a light emitting bore with inner or internal threads (FIG. 18) is brighter than the UV fluorescence image captured using a sleeve having a light emitting bore without inner or internal threads (FIG. 17). Compare, for example, a region 1705 in FIG. 17 with a region 1805 in FIG. 18. Region 1805 is brighter than region 1705. This demonstrates the effectiveness of providing a lighting bore having internal threads about the LED bulb.

The image shown in FIG. 19 shows an image of the particles captured during illumination with a white LED bulb mounted in a sleeve without internal threads. FIG. 20 shows an image of the particles captured during illumination with the white LED bulb mounted in a sleeve with internal threads. The sleeves used for the white LEDs can provide different benefits and effects and fulfill a different purpose as compared to the sleeves used for the UV LEDs.

In particular, the white-light image captured using a sleeve having a light emitting bore with inner or internal threads (FIG. 20) is dimmer, not brighter, than the white-light image captured using a sleeve having a light emitting bore without inner or internal threads (FIG. 19). Based on this observation from white-light images, it is perhaps surprising that the presence of inner threads increased, rather than decreased, the UV fluorescence image.

The white-light image shown in FIG. 19 includes several particles colored in a reddish pink. The reddish pink coloring are undesirable artifacts in the image. These deceptive effects and imperfections in the optical image can present a challenge to particle identification. The white-light image shown in FIG. 20, however, has less reddish pink coloring. Compare, for example, a region 1905 in FIG. 19 with a region 2005 in FIG. 20. Adding threads to the white light LED holder or sleeve produces better quality images. In particular the red-bias of particles around the edges of the field of view in the white light images is largely reduced, meaning the use of film diffusers or other added elements of similar function may not be required.

A white-light LED is a blue-light light source to which is added phosphors that convert blue light to lower-energy wavelengths such as green and red. Ideally, a white-light LED acts like a point source of white light with no separation of colors. In reality, a white-light LED falls short of this ideal and its various color components are not completely mixed. In the image shown in FIG. 19, (white-light without inner threads), one sees considerable variation in the apparent colors of the particles. This is an undesired artifact of less than ideal color mixing from the LED white-light source. One possible solution to this lack of color mixing problem is to place a film diffuser between the white-light LED and the particle inspection zone. However, applicant has found that inner threads in the white-light LEDs' bore holes more cost-effectively provide the color-mixing function.

In contrast to white-light LEDs, UV LEDs are monochromatic or at least quasi-monochromatic. With a UV LED, there is no need for a diffuser to mix colors.

Applicant has discovered that inner threads (i.e., internal threads about a bore within which an LED bulb is mounted) help mix color components of a white-light LED at the expense of reducing illumination intensity. For UV LEDs there is no need to mix colors and illumination intensity increase is the goal and illumination intensity reduction is to be avoided. Applicant's experience with inner threads and white-light LEDs might suggest that inner threads should be undesirable for a UV LED illumination system. Nevertheless, Applicant has discovered otherwise.

In a specific embodiment, the sleeves are plastic sleeves, e.g., made of plastic or a material having plastic. In a specific embodiment, the plastic includes acrylonitrile butadiene styrene (ABS). ABS is a type of thermoplastic. ABS has characteristics desirable for a particle monitoring device include strong resistance to physical impacts and corrosive chemicals. ABS further has a low melting temperature, making it suitable for use in injection molding manufacturing processes or three-dimensional (3D) printing. ABS can be easily machined and is relatively inexpensive. ABS is also widely available in a black or dark color which helps to provide a desirable illumination setting for capturing images of the particles. It should be appreciated, however, that the sleeve may be made of other types of plastic materials or materials other than plastic (e.g., metal, stainless steel, aluminum, or anodized aluminum). Other types of plastics include, for example, high density polyethylene, low density polyethylene, thermoplastic, amorphous thermoplastic, or other resin or polymer.

In a specific embodiment, the UV LED sleeve, white LED sleeve, or both are made of black ABS (Acrylonitrile Butadiene Styrene) plastic. There are no coatings on any sleeve surface. In particular, there is no reflective coating on the internal threads, just exposed black plastic surfaces. In a specific embodiment, the quality of captured images is best when as many surfaces surrounding the particle inspection zone and optical column are a dark color, and more particularly, black. This minimizes image corruption due to extraneous reflections of light. For this reason, it is desirable that the UV LED sleeve be black. Furthermore, cost is reduced if no coating is applied. Thus, in a specific embodiment, the UV LED sleeves, white LED sleeves, or both may be manufactured out of black ABS material. This was the case during the capture of the images in FIGS. 17-20.

In another specific embodiment, the sleeves are made of metal and black anodized but the threads still shiny, reflecting a lot of light. A gloss clear coat, for example, may be applied to the threads to produce a surface luster or brightness that reflects more light towards a field of view of a camera sensor of the particle monitor as compared to threads not having the gloss clear coat.

The efficiency with which the UV LED illuminates the particle inspection zone is of great interest, much more so than the efficiency with which the white LEDs illuminate the particle inspection zone. The reason for this is as follows. Under white light illumination, the camera sensor captures images of scattered light. This is in contrast to UV illumination. The camera sensor does not detect UV light. As a result the camera sensor does not respond to scattered UV light. It responds only to visible light from the fluorescence of certain UV-excited biomolecules. Advantageously, this makes camera images under UV illumination probes of the type and state of biomolecules present (or lacking) in particles of interest. Disadvantageously, because such fluorescence is very inefficient (very few detected visible photons out per illumination UV photon in), the fluorescence images tend to be very dim.

To compensate for the inherent dimness of fluorescence images under UV illumination, long UV exposure times, typically several seconds, may be used. For example, during the capture of the images of FIGS. 17-18, a 15-second UV exposure time was used. The choice of UV exposure time is a trade-off between fluorescence image quality and image capture rate. In contrast, white-light exposure times are a small fraction of a second. White-light illumination inefficiencies can be easily compensated with increases in white-light exposure times. An increase in efficiency of the white-light illumination system has relatively little effect on either image quality or the image capture rate. In contrast, any increase in the efficiency of the UV illumination translates directly into improved fluorescence image quality, faster image capture time, or both. For example, exceeding a 15-second UV exposure time would make it more difficult to maintain fixed positions of imaged particles during UV exposure, tax the ability of camera sensors to hold an image, increase energy consumption of UV LEDs and reduce image capture rate.

Additional benefits of the improved UV illumination efficiency provided by the internal threads are as follows. For a given exposure time, more efficient UV illumination results in a larger UV exposure dose. Via the same mechanisms upon which UV sanitation methods are based, a greater UV dose may increase alterations (e.g., dehydration and/or rupture) of imaged biological particles; in some applications such alterations may be desirable as an aid to the classification of the type or state of particles of interest. In other applications, increased UV illumination efficiency enables shorter UV exposure times and hence shorter camera sensor image integration times leading to reduced image data sizes resulting in lower demands of memory, processing power, and wireless bandwidth (e.g., wifi, cellular network or Ethernet, etc.). Furthermore, improved illumination efficiency provided by the internal threads may be used to compensate for the use of a lower power LED. Note that operating an LED at lower power and/or shorter exposure times will extend its lifetime. Embodiments allow for the use of low power LEDs and use for shorter periods of time (exposure) which extends their life much longer.

In particular, it can be difficult to maintain the collected particle sample in a stationary position for a long period of time. The sample may move. For example, the particle monitor may be jostled by a gust of wind. The other downside of having a long integration time is that the images can get bigger (e.g., image file size increases) which then requires the addition of more memory, the handling of bigger data packets by the processor, and increased bandwidth for sending or transmitting through wifi or cellular network or Ethernet, etc. Embodiments allow for the ability to focus more photons directly under the field of view of the particles of interest and lower the exposure time which is application dependent. Without the benefit of the LED sleeve, the exposure time would be longer. Embodiments of the LED sleeve provide the benefit of using lower power LEDs and while still accomplishing and gathering just as much information as more complex and expensive illumination schemes that involve for example the use of collimating lenses to focus light beams (and photons). In other words, use of a threaded UV bore hole can reduce the exposure time. The same total dose of UV light at the particle inspection zone can be achieved in less time. That is, the exposure time can be shortened because of the increase in the intensity of UV illumination and the two factors cancel each other out in determining the brightness of the camera sense image.

As discussed, another approach to increasing illumination efficiency would be to use a collimating lens. However, adding a collimating lens, plus any added support structure (possibly metal), would undesirably add cost and weight. In some embodiments, the internal threads eliminate the need for a collimating lens and support.

In other embodiments, a collimating lens may be used in addition to internal threads. In embodiments with a plastic sleeve, the use of plastic material has the additional benefit of providing a light weight design relative to designs requiring collimating lenses and/or metal lens housing. This is important in embodiments where the airborne particle monitor needs to be very low weight, for example, if added onto a drone or if used as a mobile IoT (Internet of Things) device that a user will carry with them.

To further appreciate the benefits of the invention, imagine an application and deployment where an airborne monitor is fixed in a location and multiple cartridges containing particles collected elsewhere are brought in during the day for scanning of particles. In particular, the cartridges might be brought in by drones. In this scenario, it is advantageous to collect as much UV fluorescence data and white light microscopy data as fast as possible. In particular, it is advantageous to have an illumination sensor collect as much UV fluorescence data and white light microscopy data as fast as possible. For example, farmers may want access to such data as fast as possible in order to make timely decisions on the efficacy of fungicidal sprays and/or make timely decisions whether to take additional steps to fight pathogens. In such applications a reduced UV exposure time is desirable.

It has been observed that the internal threading of the UV LED sleeve increases the efficiency of UV illumination. Upon reflection, this experimental result is perhaps rather surprising. In a specific embodiment, the sleeve material is not a metal, but rather a black plastic. A black plastic might be expected to absorb UV light rather than usefully redirect it.

Furthermore, the 45 degree thread walls would appear to be a poor choice of orientation to serve as mirror-like reflectors to redirect wide-angle photons back towards the particle inspection zone.

Despite these expectations, the interior threads have been observed to increase UV illumination efficiency. This surprising result may be interpreted as follows.

In practice, the inside tips of the threads are a bit rounded and provide some surface area with the right orientation to reflect stray UV light from the UV LED back towards the particle inspection zone.

FIG. 21 shows a section view of a UV LED sleeve 2105 holding a UV LED 2110 and having internal threads 2115 about the UV LED. FIGS. 22 and 23 show enlarged detail views of the internal threads. Arrows 2120 indicate specular reflections off of the thread teeth tips. The exact shape of the thread teeth tips depend on the detailed design of the sleeve as well as the manufacturing process used to make the sleeve. FIG. 9 shows an example of a completely flat thread tip while FIGS. 22 and 23 illustrate the case of a more rounded thread tip. The images of FIGS. 17 though 20 were captured using sleeves with internal thread tips with shapes more like the flat tips of FIG. 9 than the rounded tips of FIGS. 22 and 23. As the flat thread tips of FIG. 9 provide facet surfaces whose orientation is not optimized for illumination of the particle inspection zone (see discussion of FIG. 25), there is reason to believe that the rounded thread tips of FIGS. 22 and 23 would provide similar, or perhaps even better, results than the flat thread tips of FIG. 9.

Figure 24:
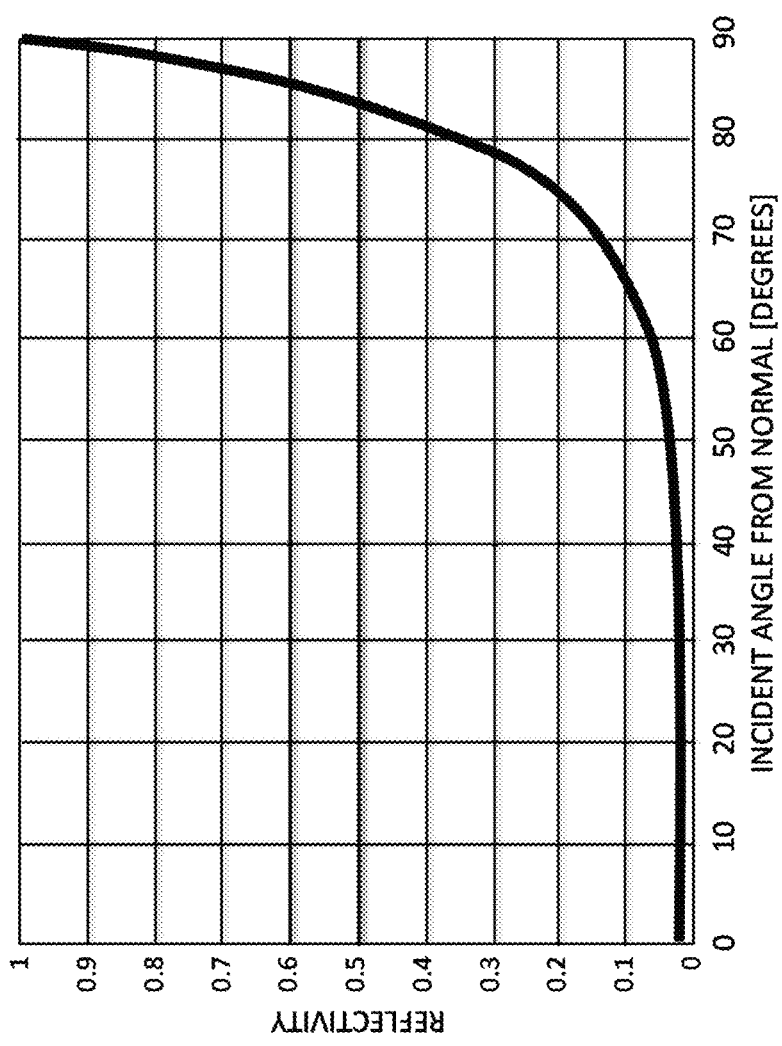
FIG. 24 shows a graph of reflectance.

It may well help that the desired specular reflections in the sketch above correspond to large angles of incidence and reflectance. FIG. 24 is a plot of strength of specular reflection of visible light off a water surface as a function of incident angle based on a plot from the wiki article on reflectance and available at https://en.wikipedia.org/wiki/Reflectance. Note that as the angle of incidence approaches 90 degrees, the reflectivity goes to 100 percent (%). It is plausible that specular reflection of UV light off ABS plastic may also benefit from such an enhancement in reflectivity as the angle of incidence approaches 90 degrees, that is, the difference between incident and reflected UV light propagation directions becomes small.

Another optical effect may also be aiding embodiments. For normal reflection (angles of incidence and reflectance equal to zero) the reflectivity of a surface is given by the following formula where $n_1$ is the index of refraction of air (with a value of one) and $n_2$ is the index of refraction of the material of the surface. Specular reflection is stronger when the material's index of refraction ($n_2$) is larger; this is likely to be true for all angles of incidence. For many materials, the index of refraction at UV wavelengths (such as at 340 nm) is larger than their index of refraction at visible wavelengths. If this is also true for ABS plastic, it could help explain the enhancement in UV illumination efficiency.

$$R_0 = \left|\frac{n_1 - n_2}{n_1 + n_2}\right|^2.$$

In a specific embodiment, the geometry of the internal threads of the sleeves are similar that of threads of threaded holes intended to receive bolts. The threads are evenly spaced with 45 degree-sloped surfaces. Like the threads on a bolt, the internal threads are in fact a single thread in a helix. As explained above, it has been discovered that, relative to a smooth cylindrical interior sleeve surface, such internal threads enhance the efficiency with which the LED (e.g., UV LED) illuminates the particle inspection zone.

While the thread geometry in the drawings above enhance UV illumination efficiency relative to a simple cylindrical surface, it is plausible that other geometries may provide an even bigger increase in the illumination efficiency including the UV illumination efficiency. The following is a discussion of modified or alternate "thread" geometries based on the assumption that the relevant UV illumination efficiency enhancement is indeed due to specular reflection off thread surfaces.

Figure 25:
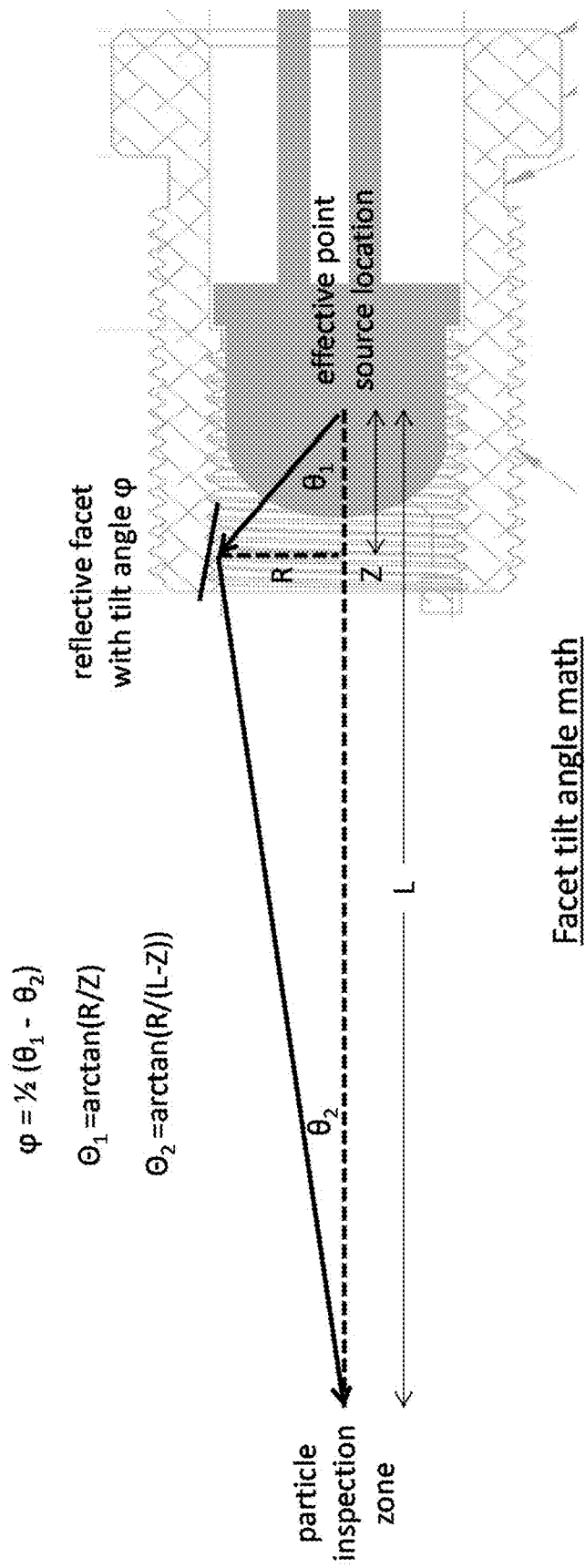
FIG. 25 shows facet tilt angle math, according to one or more embodiments.

FIG. 25 shows a technique to calculate the optimal tilt angle of a facet of a thread surface. The underlying optical principle is that for specular reflection, the angle of incidence equals the angle of reflectance. Let "L" be the distance from the particle inspection zone to the effective point source location of the UV LED. Let "Z" be the parallel distance from the effective point source location to the thread facet and "R" be the perpendicular distance or radius from the optical axis to the facet. In this case the facet tilt angle $\varphi$ with respect to the optical axis is given by the formulas as shown in FIG. 25.

Figure 26:
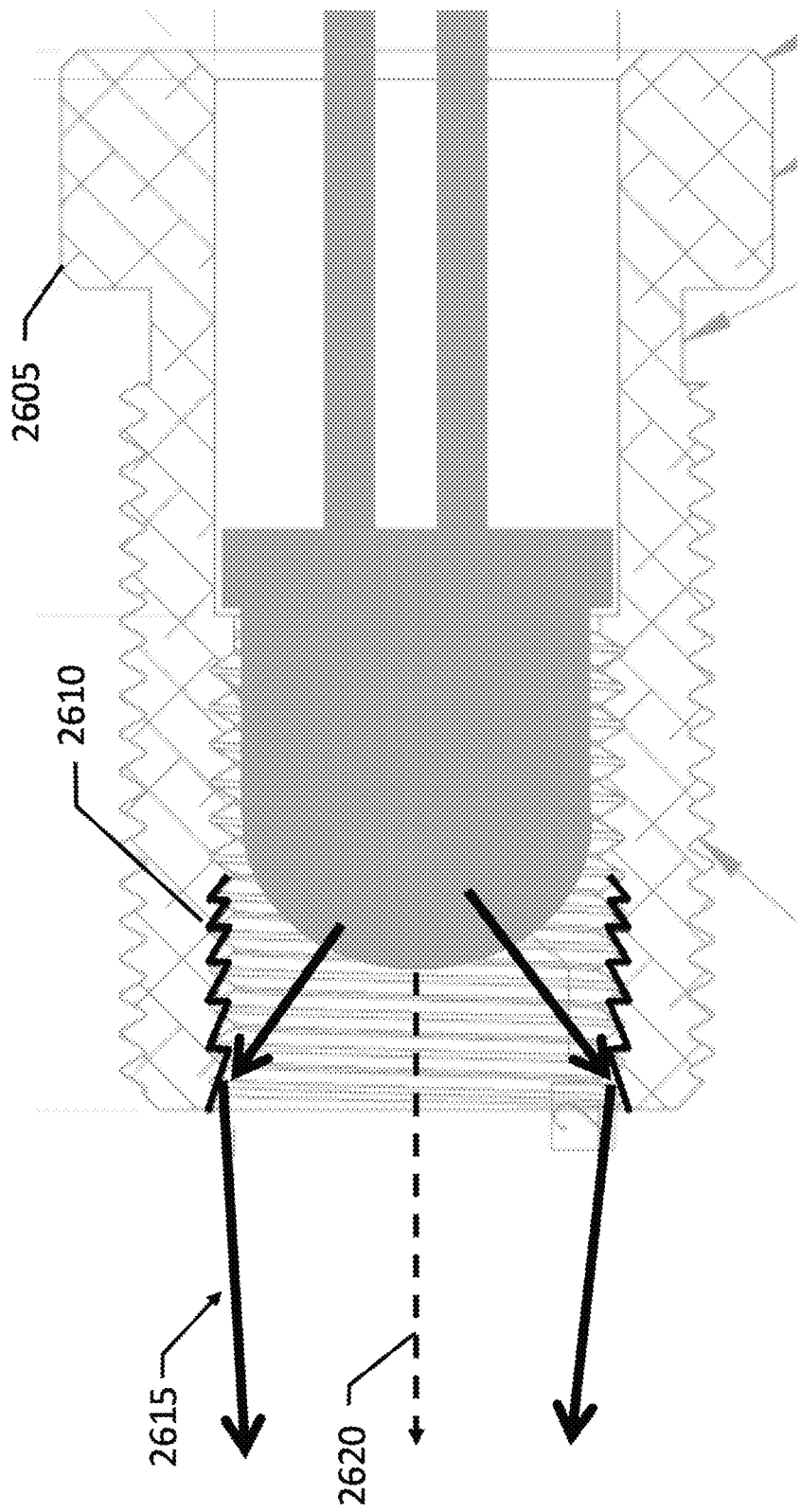
FIG. 26 shows a section view of an illumination sleeve having modified internal threads to enhance desired specular reflections, according to one or more embodiments.

This suggests that the UV illumination enhancement may be increased if the 45 degree slope of surfaces of the interior threads is modified according to the above math. See, e.g., FIG. 26. The design of sleeve 2605 as shown in FIG. 26 include a pitch and a facet tilt of the threads that vary with position. This is because in the above math, the tilt angle $\varphi$ depends on the thread location Z. To be explicit, the tilt angle may be notated as a function of Z as $\varphi(Z)$. Heavy dark line 2610 indicates a modified thread geometry that can enhance desired specular reflections 2615. Typically, the math of FIG. 25 results in the interior thread pitch increasing in the direction towards the particle inspection zone.

In FIG. 26, the threads are all at the same radius with respect to an illumination optical axis 2620. Unfortunately, much of the UV light that reflected off thread surfaces of tilt $\varphi(Z)$ is shadowed by the threads in front of it. This undesired shadowing may be reduced by varying the thread radius as illustrated in FIG. 27.

Figure 27:
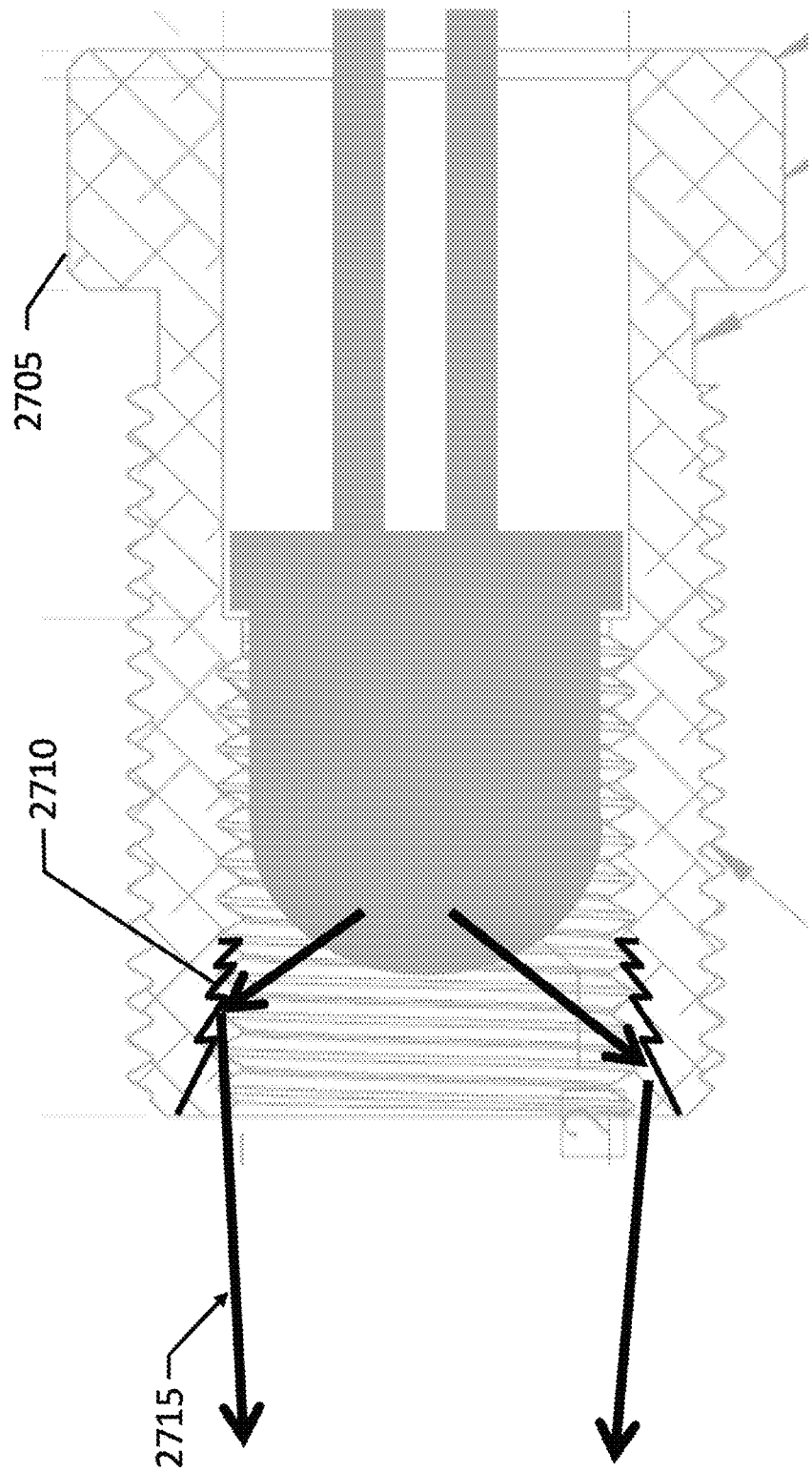
FIG. 27 shows a section view of an illumination sleeve having cone modified internal threads to enhance desired specular reflections, according to one or more embodiments.

FIG. 27 shows a section view of a sleeve 2705 having "cone modified threads" 2710 (shown by a heavy dark line) to enhance desired specular reflections 2715. In addition to modulating a conical surface, the internal threads may modify a section of a parabolic surface or other surface for which the radius of the threads relative to the illumination optical axis increases in the direction towards the particle inspection zone.

In FIGS. 26 and 27, the threads may be separate and circular, or may be a helix of one continuous thread. Both approaches may provide the same functional advantage. For some manufacturing processes, a helix of one continuous thread may be easier to fabricate.

Note that the use of a sleeve with internal threads is merely an example of one particular implementation. In other implementations, other similar and equivalent elements and functions may be used or substituted in place of what is shown. For example, rather than having microscope-system mounting structure and sleeve being separate units, the sleeve may be omitted and internal threads may be formed directly within the microscope-system mounting structure.

As another example, in a specific embodiment, the illumination source structures are adjacent or next to the optical column hole. The camera sensor and illumination source structures are above a particle inspection zone at which the particles are to be imaged by the camera sensor. In another specific embodiment, the orientation of the camera sensor and illumination source structures relative to the particle inspection zone may be flipped. That is, the particle inspection zone may above the camera sensor, illumination source structures, or both. The camera sensor, illumination source structures, or both may be below the particle inspection zone.

As another example, a light emitting element may be placed within a bore having a textured surface about an interior surface of the bore. The textured surface may or may not include internal threads. For example, the textured surface may include knurled surface, a series of radially projecting ribs that are not necessarily in a helical pattern. Furthermore the textured surface may include sets of facets having surface tilts based on the math of FIG. 25, or other surface feature. Such facets may be formed by a variety of manufacturing processes including 3D printing and injection molding. Facet surfaces might be polished. Facets may be arranged in a variety of patterns including patterns reminiscent of arrangement of scales on fish or snake skin.

As another example, a surface may include facets that reflect light in a desired angle and direction. In a specific embodiment, there is an LED sleeve that has internal facets that reflect light at a desired angle. A manufacturer may 3D print or injection mold specific facets on these and/or polish the inside of the sleeves to reflect light in a desired way.

Specific embodiments have been discussed for increasing lighting efficiency and producing good images in connection with UV light and white light. It should be appreciated, however, that such as aspects and principles may be applied to visible light including, for example, colored light (e.g., blue light, red light, green light, yellow light, and so forth).

In a specific embodiment, there is a monitor of air-borne particles including a mounting structure, a capture media, a particle inspection zone, a camera sensor and an illumination system, the illumination system including a UV LED placed in a hole in the mounting structure, wherein the efficiency of UV illumination of the particle inspection zone is enhanced by a threaded interior surface. In a specific embodiment, at least a portion of ultraviolet light from the UV LED reaches the particle inspection zone via reflection off a threaded interior surface.

In a specific embodiment, the UV LED is placed in a sleeve which contains the threaded interior surface and the sleeve with UV LED is placed in the hole of the mounting structure. In a specific embodiment, the sleeve is made of black plastic material (such as black ABS).

In a specific embodiment, the threads of the threaded interior surface are not uniformly spaced, and in particular wherein the pitch increases in the direction towards the particle inspection zone.

In a specific embodiment, the threads have a surface with a tilt angle chosen to reflect UV light in the direction of the particle inspection zone based on the principle that the angle of incidence equals the angle of reflectance.

In a specific embodiment, the radius of the threads relative to the illumination optical axis increases in the direction towards the particle inspection zone.

In a specific embodiment, there is a device for capturing images of airborne particles comprising: a camera sensor; and an illumination source structure positioned to emit light towards a field of view of the camera sensor, the illumination source structure comprising: a bore; internal threads extending along at least a portion of a length of the bore; and a light emitting diode (LED) positioned within the bore such that at least a portion of the length of the bore from an opening of the bore to a tip of the LED comprises the internal threads.

In a specific embodiment, a length of the internal threads is greater than a length of the lens of the LED. In a specific embodiment, the lens of the LED does not extend past an opening of the bore. In a specific embodiment, the LED comprises an ultraviolet (UV) LED bulb. In another specific embodiment, the LED comprises a white-light LED bulb. In another specific embodiment, the LED emits visible light. In a specific embodiment, the LED comprises a surface mount technology (SMT) packaged LED. In another specific embodiment, the LED comprises a quantum-dot based LED.

In a specific embodiment, there is a mounting structure comprising an optical column hole below the camera sensor, and an illumination hole about the optical column hole; and a sleeve, partially inserted into the illumination hole, and comprising external threads, and a head, wherein the external threads encircle the internal threads and form a press-fit with the illumination hole, and wherein the head abuts against an edge of the illumination hole in the mounting structure to limit a depth that the sleeve can be inserted into the illumination hole.

In a specific embodiment, the sleeve is made from a plastic material. In a specific embodiment, the sleeve is black in color. In a specific embodiment, at least a portion of the internal threads comprises a pitch that increases in a direction from a first end of the bore to a second end of the bore, opposite the first end, and wherein the second end of the bore is closer to the particle inspection zone than the first end of the bore. In a specific embodiment, the internal threads comprise a tilt angle selected to reflect light from the LED in a direction towards the particle inspection zone based on an angle of incidence equaling an angle of reflectance.

In a specific embodiment, a diameter of the bore increases along at least a portion of a length of the bore in a direction from a first end of the bore to a second end of the bore, opposite the first end, and wherein the second end of the bore is closer to the particle inspection zone than the first end of the bore.

In another specific embodiment, there is a device comprising: a camera sensor; a light emitting diode (LED) bulb; a mounting structure, below the camera sensor, and comprising an optical hole, and an illumination hole; and a sleeve comprising: a bore having a first portion without internal threads and a second portion with the internal threads; external threads encircling at least the second portion with the internal threads; a stop between the first and second portions; and a head, wherein the sleeve is partially inserted into the illumination hole and a diameter of the head is greater than a diameter of the illumination hole to limit a depth that the sleeve can be inserted into the illumination hole, wherein the LED bulb is inserted into the bore such that a lens of the LED bulb extends into the second portion of the bore with the internal threads, and wherein the stop abuts a flange of the LED bulb to limit a depth that the LED bulb can be inserted into the bore. In a specific embodiment, the LED bulb emits visible light. In a specific embodiment, the sleeve is made of a metal material and anodized black, and the internal threads of the sleeve reflect more light from the LED bulb as compared to a sleeve without the internal threads.

In another specific embodiment, there is an airborne particle monitoring device comprising: a camera sensor having a field of view; a light source; and a surface comprising a plurality of facets that reflect more light from the light source towards the field of view as compared to a surface without the facets.

In a specific embodiment, the facets are formed on an inside of a sleeve. In a specific embodiment, the facets are formed by three-dimensional (3D) printing. In another specific embodiment, the facets are formed by injection molding. In a specific embodiment, the light source emits visible light.

In a specific embodiment, there is an airborne particle monitoring device comprising: a camera sensor having a field of view; a light source; and a sleeve comprising a bore within which the light source is positioned, and an inside surface, wherein the inside surface is polished to reflect more light from the light source towards the field of view as compared to a surface not polished.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A monitor of airborne particles comprising:
    a mounting structure;
    a capture media;
    a particle inspection zone;
    a camera sensor; and
    an illumination system, the illumination system including an ultraviolet (UV) light emitting diode (LED) placed in a hole in the mounting structure, wherein at least a portion of ultraviolet light from the UV LED reaches the particle inspection zone via reflection off a threaded interior surface, wherein threads of the threaded interior surface are not uniformly spaced, and wherein a pitch of the threads increases in a direction from the UV LED towards the particle inspection zone.

2. The monitor of airborne particles of claim 1 wherein the UV LED is placed in a sleeve which contains the threaded interior surface and the sleeve with UV LED is placed in the hole of the mounting structure.

3. The monitor of airborne particles of claim 2 wherein the sleeve is made of a black plastic material.

4. The monitor of airborne particles of claim 1 wherein the threads have a surface with a tilt angle chosen to reflect UV light in the direction of the particle inspection zone based on an angle of incidence equaling an angle of reflectance.

5. The monitor of airborne particles of claim 1 wherein a radius of the threads relative to an illumination optical axis of the UV LED increases in the direction towards the particle inspection zone.

6. A device for capturing images of airborne particles comprising:
   a camera sensor;
   an illumination source structure positioned to emit light towards a field of view of the camera sensor, the illumination source structure comprising:
      a bore;
      internal threads extending along at least a portion of a length of the bore; and
      a light emitting diode (LED) recessed within the bore such that at least a portion of the length of the bore from an opening of the bore to a tip of the LED comprises the internal threads;
   a mounting structure comprising an optical column hole below the camera sensor, and an illumination hole about the optical column hole; and
   a sleeve, partially inserted into the illumination hole, and comprising external threads, and a head,
   wherein the external threads encircle the internal threads and form a press-fit with the illumination hole, and
      wherein the head abuts against an edge of the illumination hole in the mounting structure to limit a depth that the sleeve can be inserted into the illumination hole.

7. The device of claim 6 wherein a length of the internal threads is greater than a length of the lens of the LED.

8. The device of claim 6 wherein the lens of the LED does not extend past the opening of the bore.

9. The device of claim 6 wherein the LED comprises an ultraviolet (UV) LED bulb.

10. The device of claim 6 wherein the LED comprises a white-light LED bulb.

11. The device of claim 6 wherein the LED emits visible light.

12. The device of claim 6 wherein the LED comprises a surface mount technology (SMT) packaged LED.

13. The device of claim 6 wherein the LED comprises a quantum-dot based LED.

14. The device of claim 6 wherein the sleeve is made from a plastic material.

15. The device of claim 6 wherein the sleeve is black in color.

16. A device for capturing images of airborne particles comprising:
   a camera sensor; and
   an illumination source structure positioned to emit light towards a field of view of the camera sensor, the illumination source structure comprising:
      a bore;
      internal threads extending along at least a portion of a length of the bore; and
      a light emitting diode (LED) recessed within the bore such that at least a portion of the length of the bore from an opening of the bore to a tip of the LED comprises the internal threads, wherein at least a portion of the internal threads comprises a pitch that increases in a direction from a first end of the bore to a second end of the bore, opposite the first end, and wherein the second end of the bore is closer to the particle inspection zone than the first end of the bore.

17. A device for capturing images of airborne particles comprising:
   a camera sensor; and
   an illumination source structure positioned to emit light towards a field of view of the camera sensor, the illumination source structure comprising:
      a bore;
      internal threads extending along at least a portion of a length of the bore; and
      a light emitting diode (LED) recessed within the bore such that at least a portion of the length of the bore from an opening of the bore to a tip of the LED comprises the internal threads, wherein the internal threads comprise a tilt angle selected to reflect light from the LED in a direction towards the particle inspection zone based on an angle of incidence equaling an angle of reflectance.

18. The device of claim 6 wherein a diameter of the bore increases along at least a portion of a length of the bore in a direction from a first end of the bore to a second end of the bore, opposite the first end, and wherein the second end of the bore is closer to the particle inspection zone than the first end of the bore.

19. A device comprising:
   a camera sensor;
   a light emitting diode (LED) bulb;
   a mounting structure, below the camera sensor, and comprising an optical hole, and an illumination hole; and
   a sleeve comprising:
      a bore having a first portion without internal threads and a second portion with the internal threads;
      external threads encircling at least the second portion with the internal threads;
      a stop between the first and second portions; and
      a head, wherein the sleeve is partially inserted into the illumination hole and a diameter of the head is greater than a diameter of the illumination hole to limit a depth that the sleeve can be inserted into the illumination hole,
   wherein the LED bulb is inserted into the bore such that a lens of the LED bulb extends into the second portion of the bore with the internal threads, and
   wherein the stop abuts a flange of the LED bulb to limit a depth that the LED bulb can be inserted into the bore.

20. The device of claim 19 wherein the LED bulb comprises an ultraviolet (UV) LED bulb.

21. The device of claim 19 wherein the LED bulb comprises a white-light LED bulb.

22. The device of claim 19 wherein the LED bulb emits visible light.

23. The device of claim 19 wherein the sleeve is made of a metal material and anodized black, and the internal threads of the sleeve reflect more light from the LED bulb as compared to a sleeve without the internal threads.

* * * * *